US009729812B2

(12) United States Patent
Yamamoto

(10) Patent No.: US 9,729,812 B2
(45) Date of Patent: Aug. 8, 2017

(54) DISPLAY DEVICE

(71) Applicant: Saturn Licensing LLC, New York, NY (US)

(72) Inventor: Takeshi Yamamoto, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 229 days.

(21) Appl. No.: 14/648,449

(22) PCT Filed: Dec. 4, 2013

(86) PCT No.: PCT/JP2013/082564
§ 371 (c)(1),
(2) Date: May 29, 2015

(87) PCT Pub. No.: WO2014/091978
PCT Pub. Date: Jun. 19, 2014

(65) Prior Publication Data
US 2015/0304599 A1 Oct. 22, 2015

(30) Foreign Application Priority Data

Dec. 14, 2012 (JP) ................................. 2012-274057

(51) Int. Cl.
G02F 1/1335 (2006.01)
G02F 1/1333 (2006.01)
(Continued)

(52) U.S. Cl.
CPC ........... *H04N 5/655* (2013.01); *G06F 1/1601* (2013.01); *H04N 5/645* (2013.01); *H05K 5/0017* (2013.01);
(Continued)

(58) Field of Classification Search
CPC ......... G02F 1/133308; G02F 1/133615; G02F 2001/133314; G02F 1/133608;
(Continued)

(56) References Cited

U.S. PATENT DOCUMENTS 8,870,437 B2 * 10/2014 Yoshikawa ....... G02F 1/133608
349/58
2010/0188607 A1 * 7/2010 Park ..................... G02B 6/0073
349/62

(Continued)

FOREIGN PATENT DOCUMENTS

| CN | 101923230 A | 12/2010 |
|---|---|---|
| CN | 102213849 A | 10/2011 |

(Continued)

OTHER PUBLICATIONS

Japanese Utility Model Application No. 180438/1982 (Laid-open No. 84573/1984) (Nippon Seiki Co., Ltd.), Jun. 7, 1984 (Jun. 7, 1984), pp. 1-2.

(Continued)

*Primary Examiner* — Huyen Ngo
(74) *Attorney, Agent, or Firm* — Lerner, David, Littenberg, Krumholz & Mentlik, LLP

(57) ABSTRACT

Included are: a front side unit including a display and a bezel, the display being configured to allow an image to be displayed on a display screen, and the bezel supporting the display from a peripheral side and including an attached protrusion; and a rear side unit including a back chassis and an attachment frame, the back chassis being disposed on an opposite surface side to the display screen of the display, and the attachment frame being attached to a surface on a display side of the back chassis and including an attaching protrusion. The front side unit is configured to be butted against the rear side unit and slid with respect to the rear side unit in a surface direction of the display screen, allowing the attached (Continued)

protrusion to be engaged with the attaching protrusion to allow the front side unit to be connected to the rear side unit.

7 Claims, 30 Drawing Sheets

(51) Int. Cl.
    *H04N 5/655*     (2006.01)
    *G06F 1/16*     (2006.01)
    *H04N 5/645*     (2006.01)
    *H05K 5/00*     (2006.01)
    *H05K 5/02*     (2006.01)

(52) U.S. Cl.
    CPC ... *H05K 5/02* (2013.01); *G02F 2001/133322* (2013.01); *G02F 2001/133325* (2013.01); *G02F 2201/46* (2013.01); *G02F 2201/465* (2013.01)

(58) Field of Classification Search
    CPC .......... G02F 2001/133317; G02F 2001/13332; G02F 2201/46; G02B 6/0088
    See application file for complete search history.

(56) References Cited

U.S. PATENT DOCUMENTS

2010/0302717 A1* 12/2010 Oh .................... G02F 1/133308
    361/679.01
2011/0249213 A1   10/2011 Kawashima et al.
2012/0162570 A1   6/2012 Lee et al.
2015/0282334 A1* 10/2015 Yamamoto ........ G02F 1/133308
    362/97.1

FOREIGN PATENT DOCUMENTS

| | | |
|---|---|---|
| CN | 102645762 A | 8/2012 |
| JP | 2003-050395 A | 2/2003 |
| JP | 2004-053964 A | 2/2004 |
| JP | 2007-334244 A | 12/2007 |
| JP | 2010-181462 A | 8/2010 |
| TW | M1423428 U | 2/2012 |
| TW | M1423429 U | 2/2012 |

OTHER PUBLICATIONS

Microfilm of the specification and drawings annexed to the request of Japanese Utility Model Application No. 180438/1982 (Laid-open No. 84573/1984) (Nippon Seiki Co., Ltd.), Jun. 7, 1984 (Jun. 7, 1984).

International Search Report from International Publication PCT/JP2013/082564 mailed Feb. 4, 2014.

Chinese Office Action for Chinese Application No. CN201380063917.X dated Mar. 29, 2017.

Chinese Search Report for Application No. CN201380063917X dated Mar. 21, 2017.

* cited by examiner

DISPLAY DEVICE

CROSS-REFERENCE TO RELATED APPLICATION

The present application is a national phase entry under 35 U.S.C. §371 of International Application No. PCT/JP2013/082564 filed Dec. 4, 2013, published on Jun. 19, 2014 as WO 2014/091978 A1, which claims priority from Japanese Patent Application No. JP 2012-274057 filed in the Japanese Patent Office on Dec. 14, 2012.

TECHNICAL FIELD

The present technology relates to a technical field concerning a display device. Specifically, it relates to a technical field concerning a thin display device including a display and a back chassis.

CITATION LIST

Patent Literature

Patent Literature 1: JP 2007-334244A

BACKGROUND ART

For a display device of a television receiver, a personal computer, or the like, there has been one that is provided with a display having a display screen on which an image is displayed; on a back surface side of the display, a back chassis is disposed; and the display is supported by a frame-shaped bezel from a peripheral side (for example, refer to Patent Literature 1).

The display device described in Patent Literature 1 is configured as follows: the bezel that supports the display from its peripheral side is formed in a shape of a plate that is directed in a front-rear direction; the display is attached to a rear surface of the bezel; and the back chassis is disposed on a rear surface of the display.

SUMMARY OF INVENTION

However, in the display device described in Patent Literature 1, the frame-shaped bezel is formed in the shape of the plate that is directed in the front-rear direction, and the bezel is attached to other members such as the back chassis by adhesion or other methods. Therefore, attaching work of the bezel takes labor, causing a disadvantage of lowered workability in assembly work of a display device.

It is therefore desirable to enhance workability in assembly work.

First, a display device according to an embodiment of the present technology includes: a front side unit that includes a display and a bezel, the display being configured to allow an image to be displayed on a display screen, and the bezel supporting the display from a peripheral side and including an attached protrusion; and a rear side unit that includes a back chassis and an attachment frame, the back chassis being disposed on an opposite surface side to the display screen of the display, and the attachment frame being attached to a surface on a display side of the back chassis and including an attaching protrusion. The front side unit is configured to be butted against the rear side unit and slid with respect to the rear side unit in a surface direction of the display screen, which allows the attached protrusion to be engaged with the attaching protrusion to allow the front side unit to be connected to the rear side unit.

Therefore, in the display device according to the embodiment of the present technology, the front side unit and the rear side unit are connected together by sliding work of the front side unit with respect to the rear side unit.

Second, in the display device according to the above-described embodiment of the present technology, it is desirable that the bezel is elastically deformable, the bezel includes a latch protrusion, and the attachment frame includes a fall-preventing protrusion. The latch protrusion is configured, when the front side unit is slid with respect to the rear side unit, to be slid against the fall-preventing protrusion to allow the bezel to deform elastically, to get over the fall-preventing protrusion to allow the bezel to return elastically, and to be latched with the fall-preventing protrusion.

When the front side unit is slid with respect to the rear side unit, the latch protrusion is slid against the fall-preventing protrusion to allow the bezel to deform elastically, and the latch protrusion gets over the fall-preventing protrusion to allow the bezel to return elastically, which allows the latch protrusion to be latched with the fall-preventing protrusion. Thus, the latch protrusion is latched with the fall-preventing protrusion simultaneously with sliding of the front side unit.

Third, it is desirable that the display device according to the above-described embodiment of the present technology includes: a light source configured to emit light as backlight that is incident on the display; a light control plate disposed between the back chassis and the display, the light control plate being configured to control light emitted from the light source; and a support member attached to the back chassis. The support member includes a base section and a support section, the base section being attached to the back chassis, and the support section being continuous with the base section and being elastically deformable. The support section is configured to support at least part of the light control plate and to deform elastically in response to expansion or contraction of the light control plate due to a temperature change.

The support member includes the base section and the support section, the base section being attached to the back chassis, and the support section being continuous with the base section and being elastically deformable. The support section supports at least part of the light control plate and deforms elastically in response to expansion or contraction of the light control plate due to a temperature change. Therefore, little load accompanying expansion or contraction due to a temperature change is applied to the light control plate.

Fourth, it is desirable that the display device according to the above-described embodiment of the present technology includes a receiving member, wherein the light control plate includes corners, some of which are received by the receiving member in a surface direction of the light control plate, and others of which are supported by the support section.

Some of the corners of the light control plate are received by the receiving member, and others of the corners of the light control plate are supported by the supported section. Therefore, expansion or contraction of the light control plate occurs with the receiving member as a reference position.

Fifth, it is desirable that the display device according to the above-described embodiment of the present technology includes: a light source unit including a light source configured to emit light as backlight that is incident on the display; and a heat dissipation member attached to the back chassis, the heat dissipation member being configured to release heat generated when the light source is driven. The light source unit is disposed on the heat dissipation member, and the attachment frame includes a positioning section configured to perform positioning of the heat dissipation member.

The light source unit is disposed on the heat dissipation member, and the attachment frame includes the positioning section configured to perform positioning of the heat dissipation member. Therefore, a position of the light source in a predetermined direction is determined by the attachment frame.

Sixth, it is desirable that the display device according to the above-described embodiment of the present technology includes: an optical body disposed between the display and the back chassis, the optical body including an optical sheet and an insertion hole; and a sheet holding member including a first engaging protrusion and a second engaging protrusion, the first engaging protrusion being engaged with the attachment frame, and the second engaging protrusion being inserted in the insertion hole. The first engaging protrusion and the second engaging protrusion are configured to be engaged with the attachment frame in a state in which the second engaging protrusion is inserted in the insertion hole, which allows the sheet holding member to be connected to the attachment frame to allow the optical body to be held.

The first engaging protrusion and the second engaging protrusion are engaged with the attachment frame in a state in which the second engaging protrusion is inserted in the insertion hole, which allows the sheet holding member to be connected to the attachment frame to allow the optical body to be held. Therefore, the sheet holding member is connected to the attachment frame to allow the optical body to be held.

Seventh, in the display device according to the above-described embodiment of the present technology, it is desirable that the sheet holding member includes a retaining surface section, the retaining surface section retaining the optical body to press the optical body onto the attachment frame.

The sheet holding member includes the retaining surface section that retains the optical body to press the optical body onto the attachment frame. Therefore, when the sheet holding member is connected to the attachment frame, simultaneously, the optical body is pressed onto the attachment frame by the retaining surface section.

The display device according to the embodiment of the present technology includes: a front side unit that includes a display and a bezel, the display being configured to allow an image to be displayed on a display screen, and the bezel supporting the display from a peripheral side and including an attached protrusion; and a rear side unit that includes a back chassis and an attachment frame, the back chassis being disposed on an opposite surface side to the display screen of the display, and the attachment frame being attached to a surface on a display side of the back chassis and including an attaching protrusion. The front side unit is configured to be butted against the rear side unit and slid with respect to the rear side unit in a surface direction of the display screen, which allows the attached protrusion to be engaged with the attaching protrusion to allow the front side unit to be connected to the rear side unit.

Hence, it is possible to facilitate connecting work of the front side unit to the rear side unit, and to enhance workability of assembly work of a display device.

In the embodiment of the present technology, the bezel is elastically deformable, the bezel includes a latch protrusion, and the attachment frame includes a fall-preventing protrusion. The latch protrusion is configured, when the front side unit is slid with respect to the rear side unit, to be slid against the fall-preventing protrusion to allow the bezel to deform elastically, to get over the fall-preventing protrusion to allow the bezel to return elastically, and to be latched with the fall-preventing protrusion.

Hence, it is possible to achieve a stable connecting state of the front side unit to the rear side unit with simple work.

In the embodiment of the present technology, the display device according to the embodiment of the present technology includes: a light source configured to emit light as backlight that is incident on the display; a light control plate disposed between the back chassis and the display, the light control plate being configured to control light emitted from the light source; and a support member attached to the back chassis. The support member includes a base section and a support section, the base section being attached to the back chassis, and the support section being continuous with the base section and being elastically deformable. The support section is configured to support at least part of the light control plate and to deform elastically in response to expansion or contraction of the light control plate due to a temperature change.

Hence, little load accompanying expansion or contraction due to a temperature change is applied to the light control plate. This makes it possible to secure a stable supporting state of the light control plate with a simple structure while preventing warpage of the light control plate.

In the embodiment of the present technology, the display device according to the embodiment of the present technology includes a receiving member, wherein the light control plate includes corners, some of which are received by the receiving member in a surface direction of the light control plate, and others of which are supported by the support section.

Hence, the light control plate is displaced in a smaller number of directions, making it possible to reduce positional changes of the light control plate with respect to other components.

In the embodiment of the present technology, the display device according to the embodiment of the present technology includes: a light source unit including a light source configured to emit light as backlight that is incident on the display; and a heat dissipation member attached to the back chassis, the heat dissipation member being configured to release heat generated when the light source is driven. The light source unit is disposed on the heat dissipation member, and the attachment frame includes a positioning section configured to perform positioning of the heat dissipation member.

Hence, the heat dissipation member is positioned by the attachment frame to allow the light source to be positioned in a vertical direction. This makes it possible to perform positioning of the light source securely at a predetermined position with a simple structure.

In the embodiment of the present technology, the display device according to the embodiment of the present technology includes: an optical body disposed between the display and the back chassis, the optical body including an optical sheet and an insertion hole; and a sheet holding member including a first engaging protrusion and a second engaging protrusion, the first engaging protrusion being engaged with the attachment frame, and the second engaging protrusion being inserted in the insertion hole. The first engaging protrusion and the second engaging protrusion are configured to be engaged with the attachment frame in a state in which the second engaging protrusion is inserted in the insertion hole, which allows the sheet holding member to be connected to the attachment frame to allow the optical body to be held.

Hence, it is possible to support the optical body securely at a predetermined position by simple work.

In the embodiment of the present technology, the sheet holding member includes a retaining surface section, the retaining surface section retaining the optical body to press the optical body onto the attachment frame.

Hence, when the sheet holding member is connected to the attachment frame, the optical body is pressed securely onto the attachment frame, making it possible to achieve stabilization of a supporting state of the optical body.

DESCRIPTION OF EMBODIMENTS

In the following, embodiments for carrying out a display device according to an embodiment of the present technology will be described with reference to the attached drawings.

Embodiments that will be described below involve application of the display device according to the embodiment of the present technology to a television receiver that is configured to allow an image to be displayed on a display.

It is to be noted that a range of application of the present technology is not limited to a television receiver, and the present technology has a wide range of application to various display devices such as monitors used in a personal computer and so forth.

[Configuration of Display Device]

A display device (a television receiver) 1 may be formed, for example, in a laterally long, flat, and substantially rectangular shape, and may include a display 2, a back chassis 3, and a bezel 4 (refer to FIGS. 1 to 4). The display 2 is configured to allow an image to be displayed. The back chassis 3 is disposed behind the display 2. The bezel 4 is disposed on a peripheral side of the display 2 and the back chassis 3.

Figure 3:
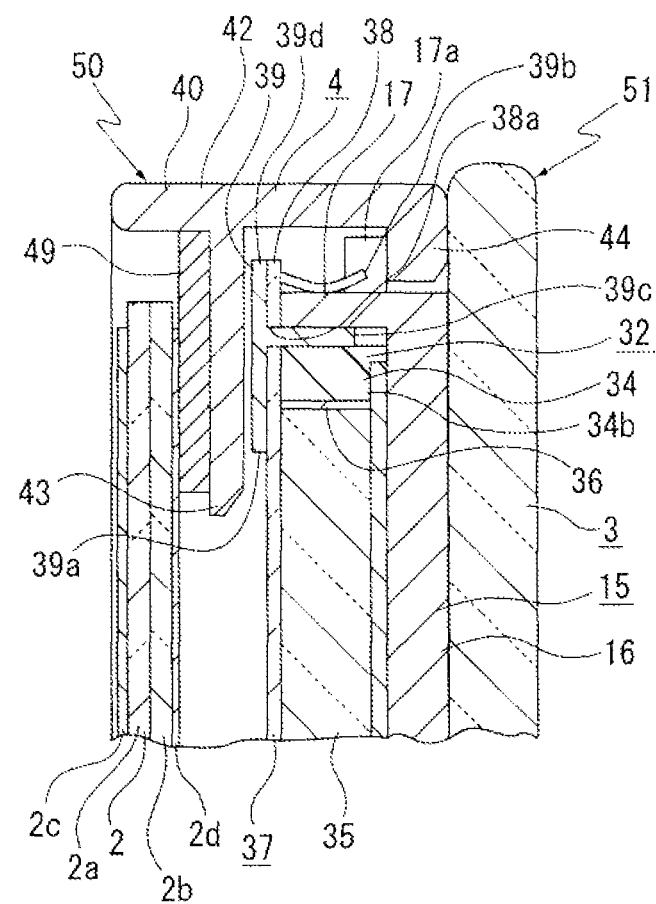
FIG. 3 is an enlarged cross-sectional view illustrating an upper end side of the display device.
Figure 4:
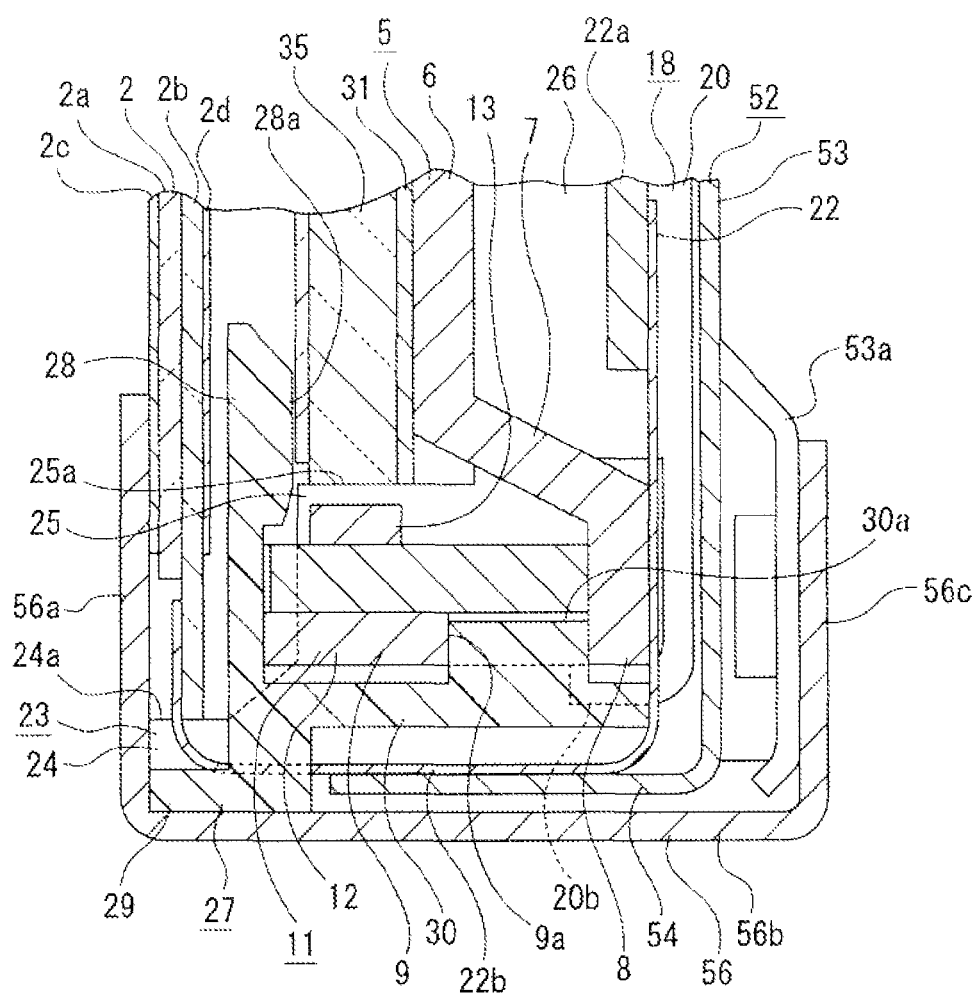
FIG. 4 is an enlarged cross-sectional view illustrating part of a lower end side of the display device.

The display 2 may be formed in a shape of a plate directed in a front-rear direction, and may be configured of, for example, as illustrated in FIGS. 3 and 4, glass plates 2a and 2b, a first polarization sheet 2c, and a second polarization sheet 2d. The glass plates 2a and 2b are front-rear joined. The first polarization sheet 2c is bonded to a front surface of the glass plate 2a. The second polarization sheet 2d is bonded to a rear surface of the glass plate 2b. The first polarization sheet 2c may be one size smaller than the glass plate 2a and may be bonded to a portion other than a periphery of the glass plate 2a. The second polarization sheet 2d may be one size smaller than the first polarization sheet 2c and may be bonded to a portion other than a periphery of the glass plate 2b. The glass plate 2b has a slightly larger length in a vertical direction than that of the glass plate 2a, and a lower end of the glass plate 2b is located below a lower end of the glass plate 2a.

In the display 2, a region except for a periphery of the first polarization sheet 2c, of a front surface of the display 2 may constitute a display screen 2e on which an image is displayed.

The back chassis 3 may be, for example, made of glass and formed in a shape of a plate. Since plate glass is used as the back chassis 3, high strength is secured even in a case that the back chassis 3 is thin, making it possible to achieve enhancement of strength and reduction in thickness of the display device 1.

Figure 5:
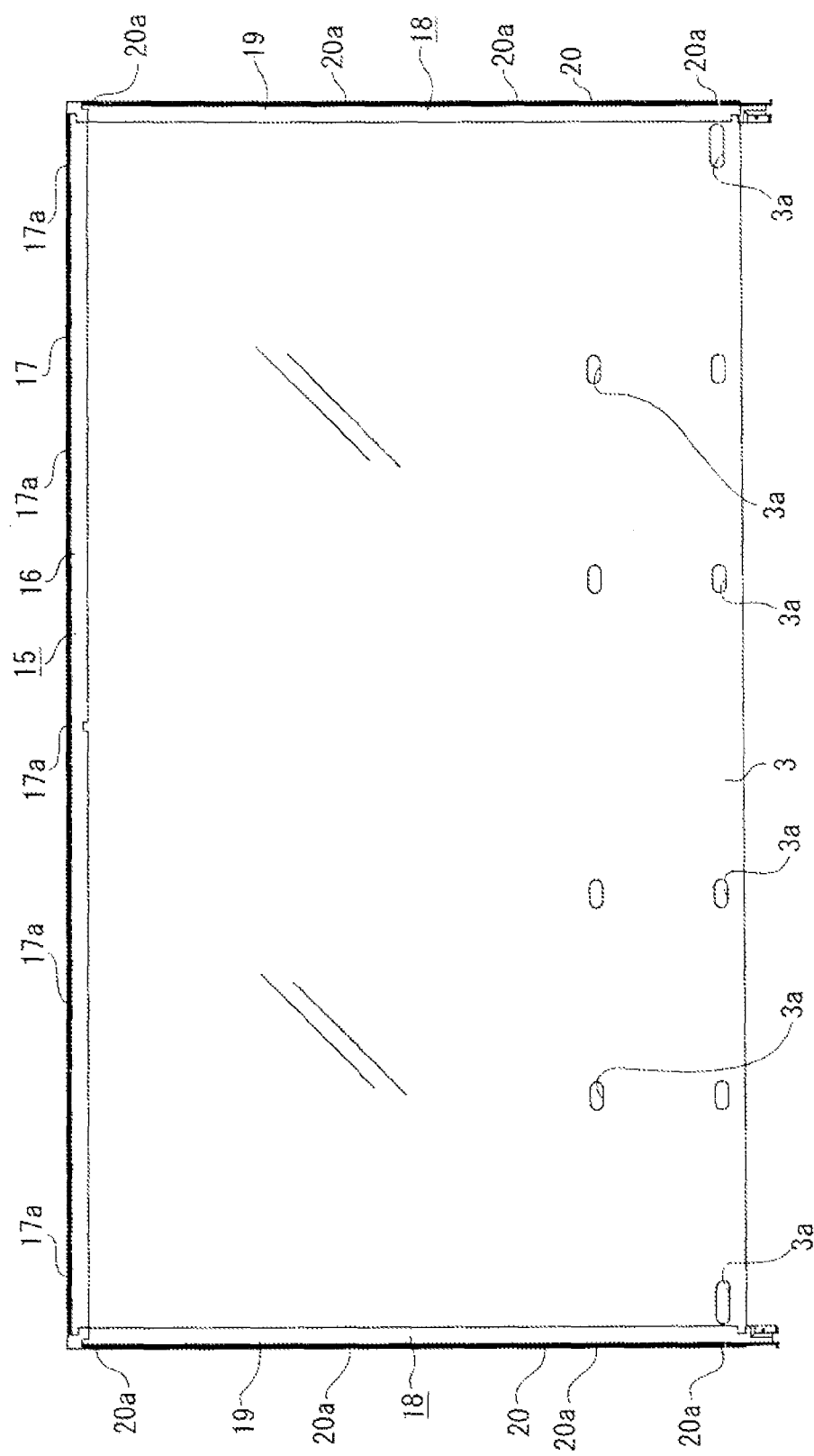
FIG. 5 is a front view illustrating a back chassis and an attachment frame attached to the back chassis.
Figure 6:
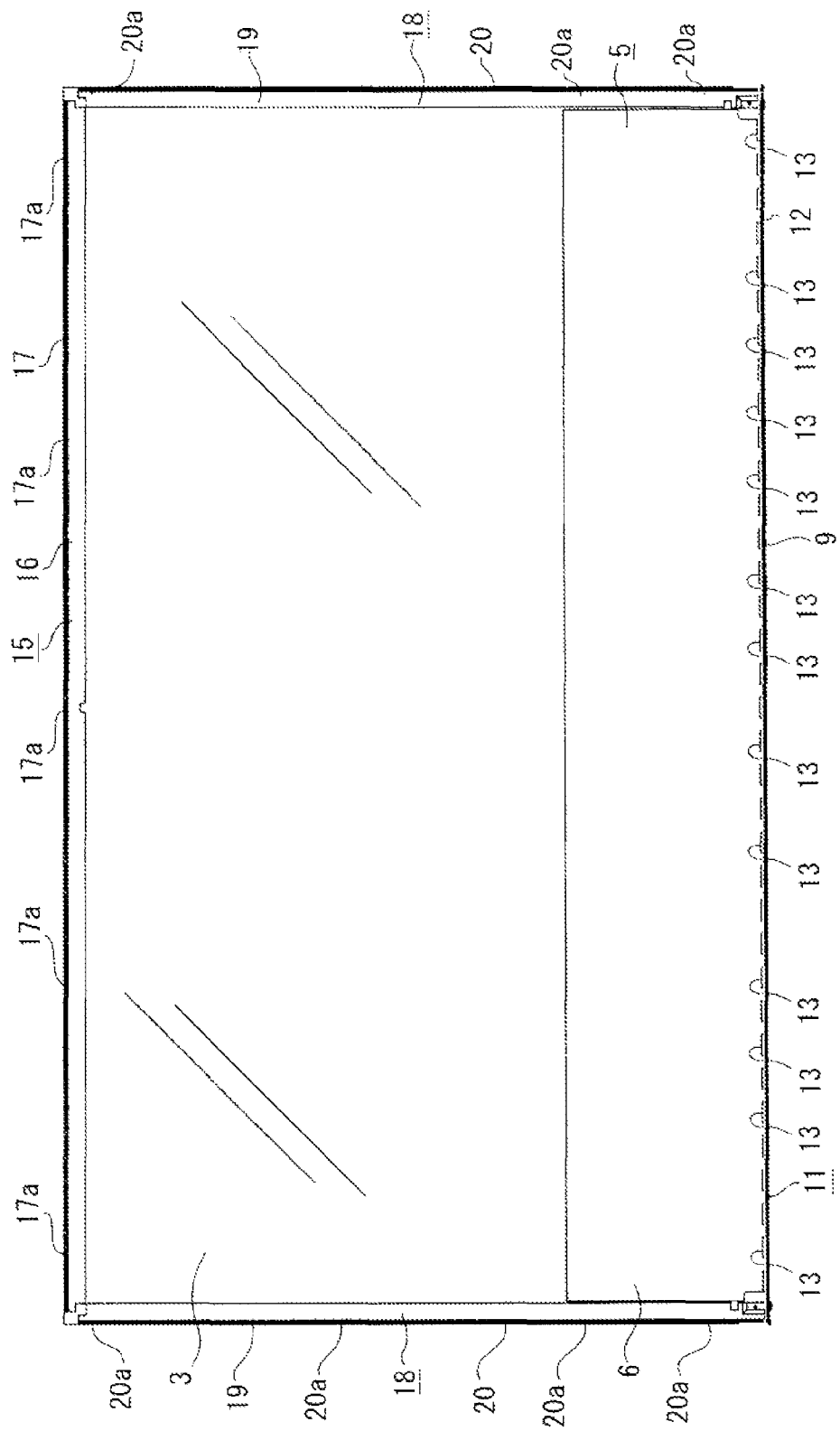
FIG. 6 is a front view illustrating a state in which a heat dissipation member is attached to the back chassis.

In a portion on a lower side of the back chassis 3, shaft insertion holes 3a, 3a, . . . may be provided (refer to FIG. 5). To the portion on the lower side of the back chassis 3, a heat dissipation member 5 may be attached (refer to FIG. 6).

Figure 7:
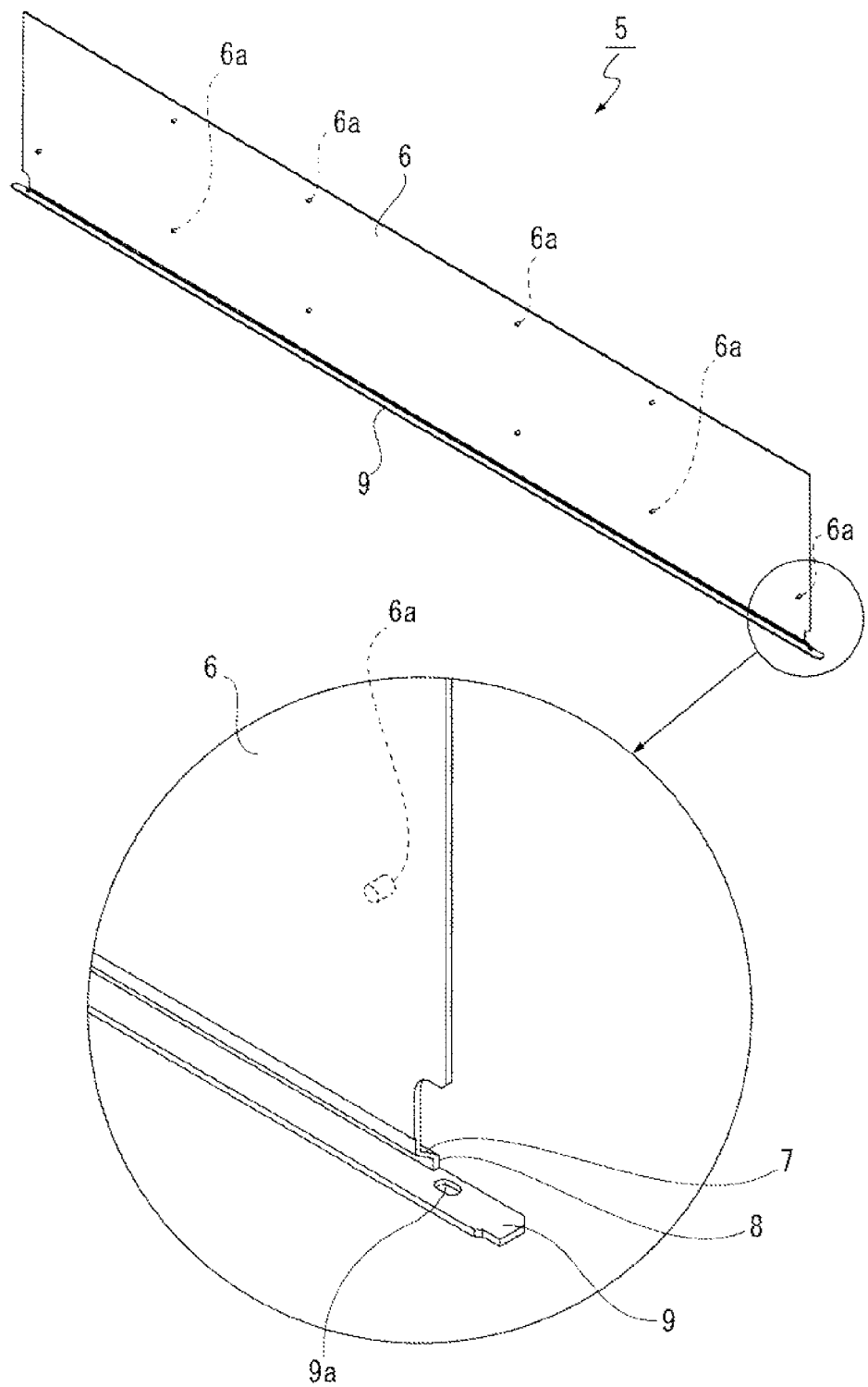
FIG. 7 is a perspective view of the heat dissipation member.

The heat dissipation member 5 may include, as illustrated in FIG. 7, a heat dissipation surface section 6, an inclined surface section 7, a connecting surface section 8, and a mount surface section 9 that are integrally formed and made of a metal material. The heat dissipation surface section 6 is laterally long and directed in the front-rear direction. The inclined surface section 7 is protruded obliquely downward from a lower end of the heat dissipation surface section 6. The connecting surface section 8 is protruded downward from a lower end of the inclined surface section 7. The mount surface section 9 is protruded forward from a lower end of the connecting surface section 8. In the mount surface section 9, connection holes 9a, 9a may be formed on both right and left ends. In the mount surface section 9, both the right and the left ends are protruded sideward (outward) beyond the heat dissipation surface section 6.

The heat dissipation surface section 6 of the heat dissipation member 5 may be provided with fixing bosses 6a, 6a, . . . that are protruded rearward. The heat dissipation member 5 may be connected to the back chassis 3 by inserting the fixing bosses 6a, 6a, . . . from a front side in the respective shaft insertion holes 3a, 3a, . . . of the back chassis 3.

Figure 8:
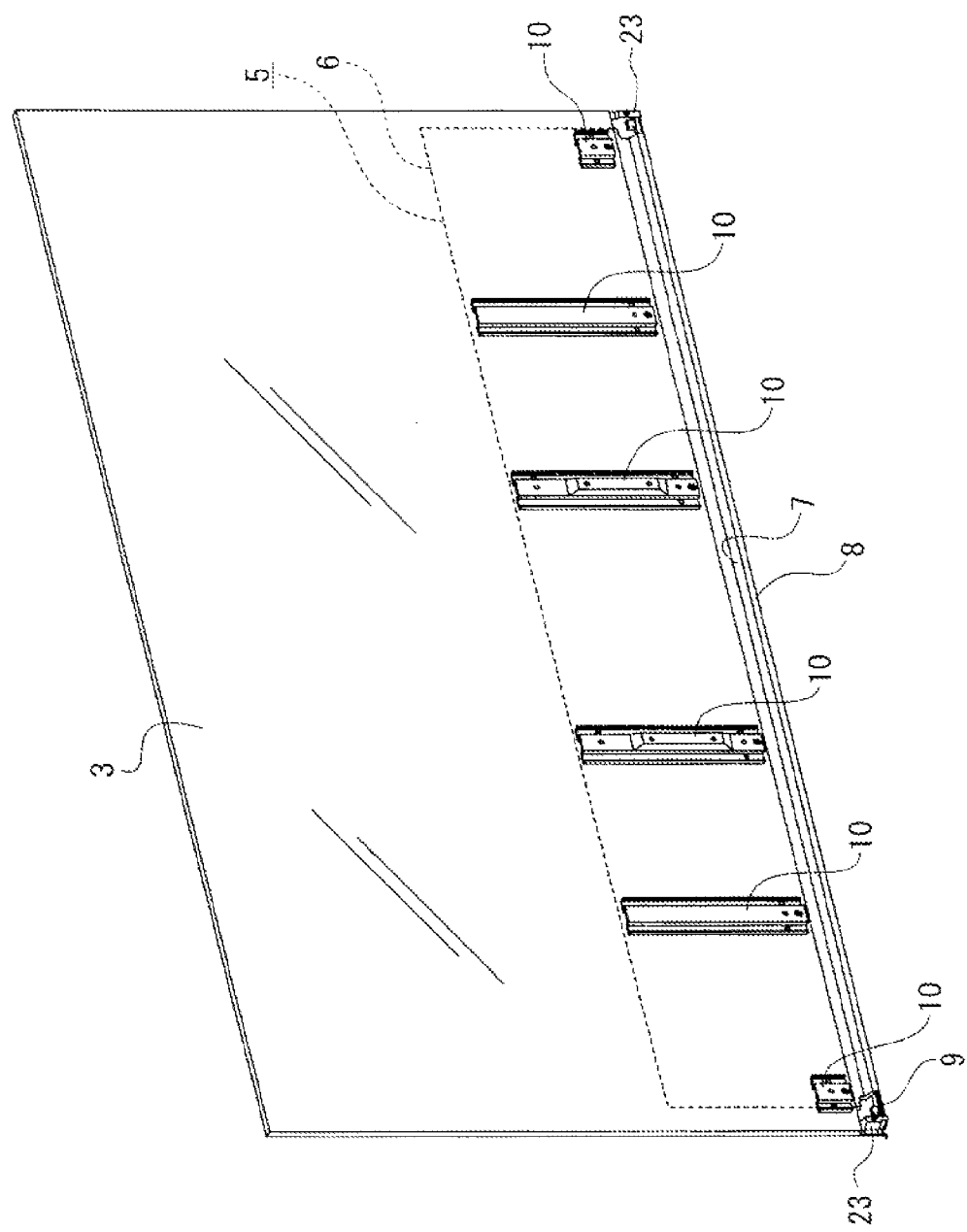
FIG. 8 is a perspective view illustrating a state in which a link member and the heat dissipation member are attached to the back chassis.

To the portion on the lower side in a rear surface of the back chassis 3, link members 10, 10, . . . may be attached at horizontally spaced positions (refer to FIG. 8). The link member 10 may be provided with a shallow insertion recess 10a and a screw insertion hole. The insertion recess 10a is opened forward and at least downward. The screw insertion hole is penetrated in the front-rear direction. Attachment screws may be inserted in the respective screw insertion holes of the link members 10, 10, . . . . The attachment screws may be screwed with the fixing bosses 6a, 6a, . . . to allow the heat dissipation member 5 to be fixed to the back chassis 3. In a state in which the heat dissipation member 5 is fixed to the back chassis 3, a lower end of the heat dissipation surface section 6, the inclined surface section 7, the connecting surface section 8, and the mount surface section 9 may be located below the back chassis 3.

Figure 9:
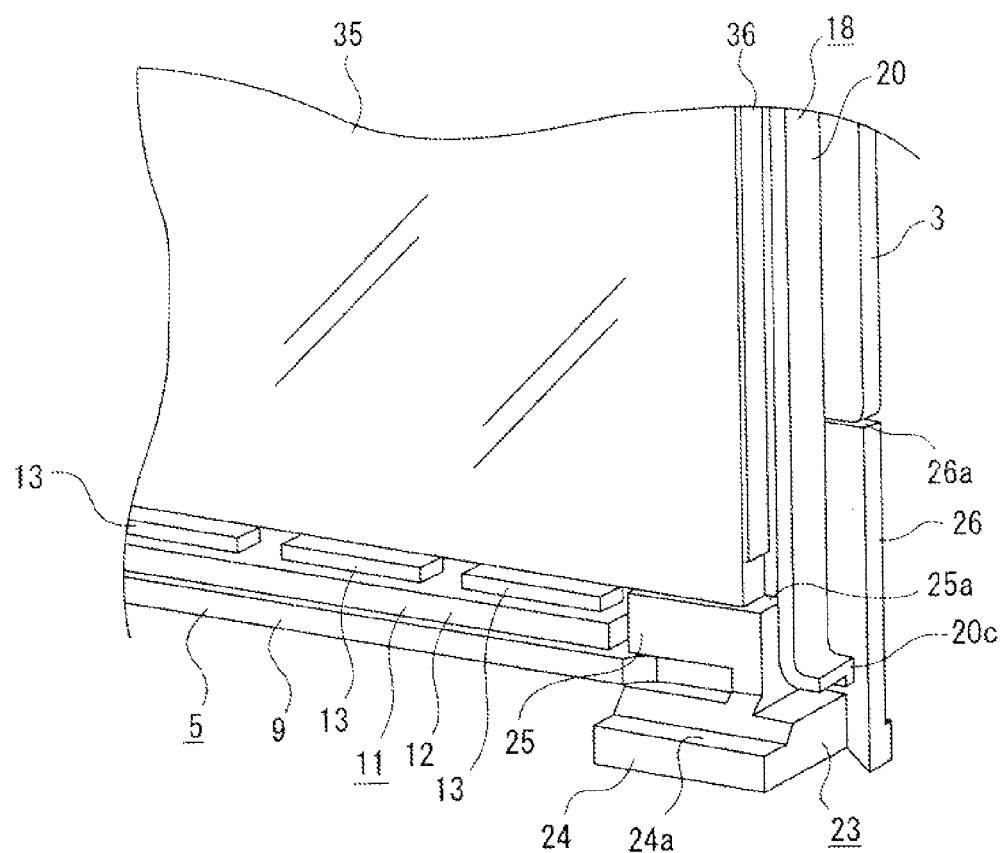
FIG. 9 is a perspective view illustrating a state in which a light guide plate and the back chassis are received by a receiving member.
Figure 10:
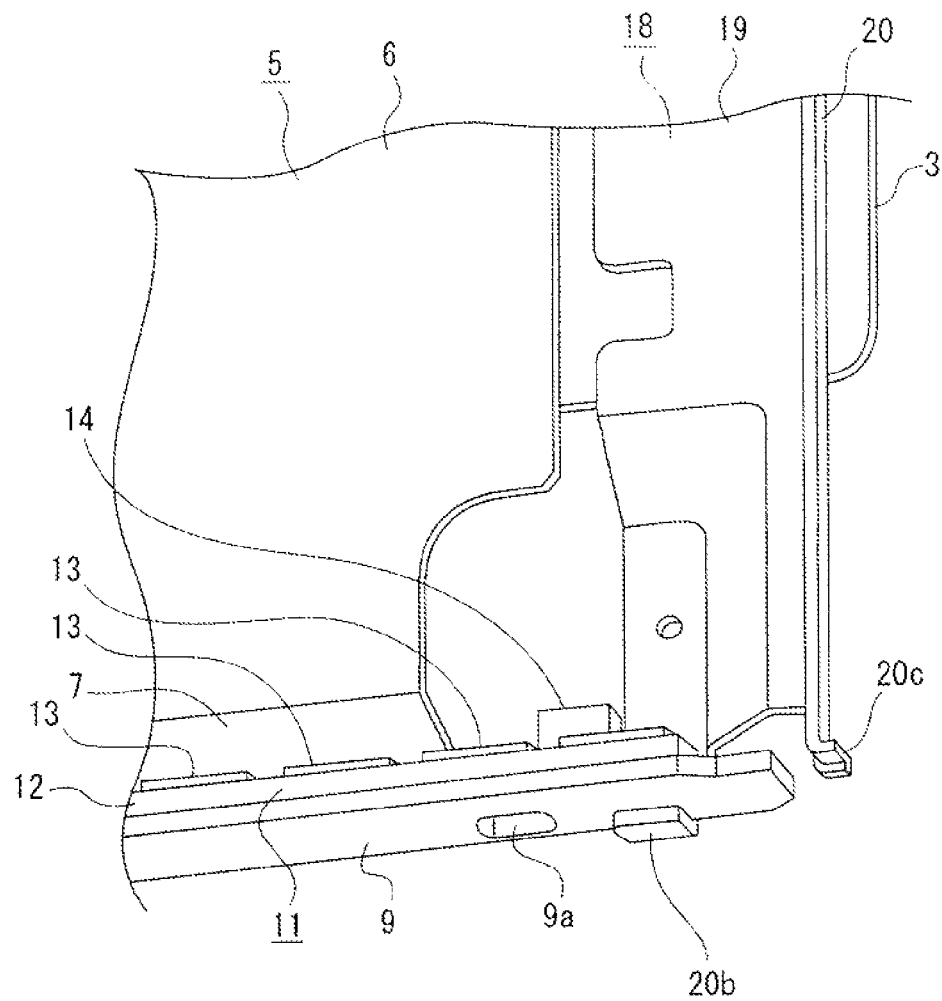
FIG. 10 is a perspective view illustrating a state in which the heat dissipation member is positioned at a positioning section of the attachment frame.

To an upper surface of the mount surface section 9, a light source unit 11 may be attached (refer to FIGS. 4, 9, and 10). The light source unit 11 may include a laterally long substrate 12 and light sources 13, 13, . . . . The light sources 13, 13, . . . are mounted on the substrate 12 at horizontally spaced positions. As the light source 13, for example, a light emitting diode (an LED) may be used. To one end in a longitudinal direction of the substrate 12, a connector 14 may be connected.

Figure 11:
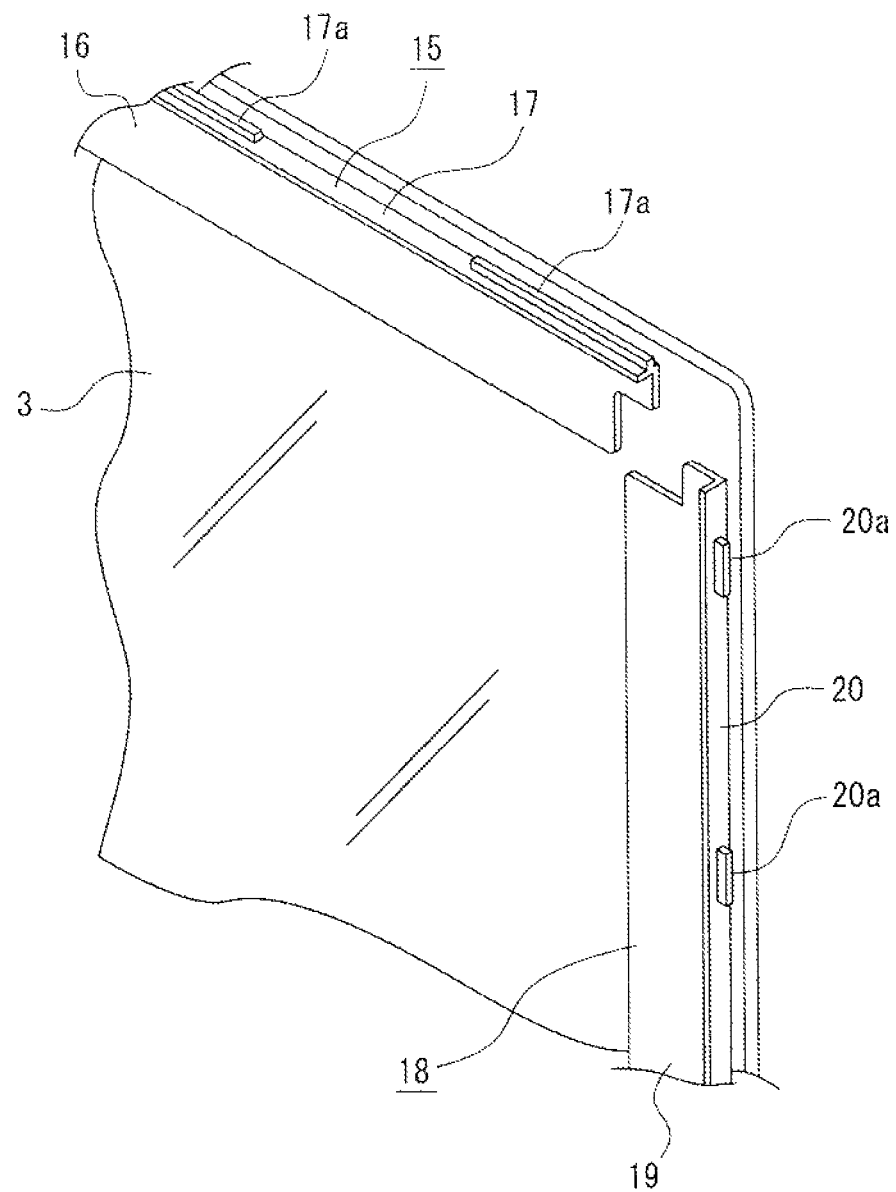
FIG. 11 is a perspective view illustrating the back chassis and the attachment frame.

To an upper end in a front surface of the back chassis 3, a laterally long first attachment frame 15 may be attached by adhesion or the like (refer to FIG. 11). The first attachment frame 15 may be configured of an attached surface section 16 and a protruded surface section 17, and the attached surface section 16 may be attached to the back chassis 3. The attached surface section 16 is directed in the front-rear direction. The protruded surface section 17 is protruded forward from an upper end of the attached surface section 16. The protruded surface section 17 may be provided with attaching protrusions 17a, 17a, . . . at horizontally spaced positions. The attaching protrusions 17a, 17a, . . . are protruded upward from a center portion in the front-rear direction.

Figure 12:
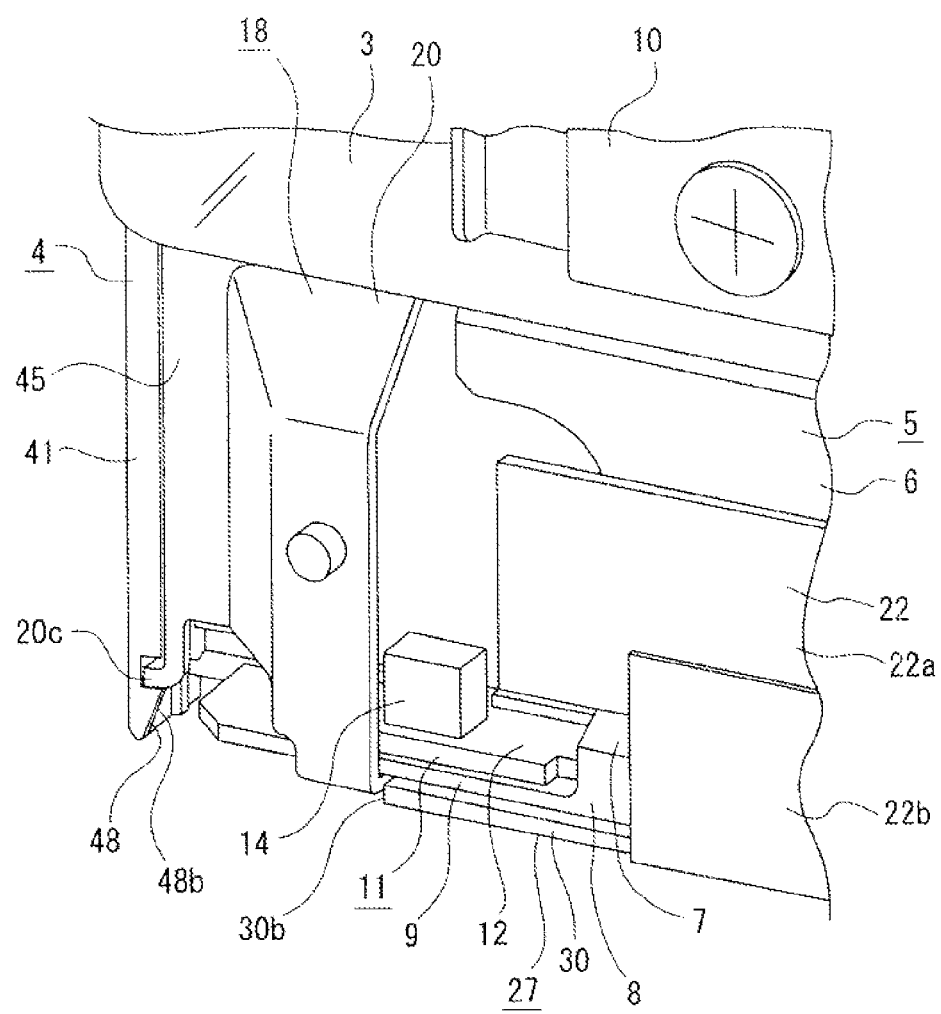
FIG. 12 is a perspective view illustrating a state in which a latch protrusion of a bezel is latched with a fall-preventing protrusion of the attachment frame, with the receiving member omitted.

To both right and left ends in the front surface of the back chassis 3, vertically long second attachment frames 18 may be attached by adhesion or the like. The second attachment frame 18 may be configured of an attached surface section 19 and a protruded surface section 20, and the attached surface section 19 may be attached to the back chassis 3. The attached surface section 19 is directed in the front-rear direction. The protruded surface section 20 is protruded forward from an outer end (a side end) of the attached surface section 19. The protruded surface section 20 may be provided with attaching protrusions 20a, 20a, . . . at vertically spaced positions. The attaching protrusions 20a, 20a, . . . are protruded outward (sideward) from a center portion in the front-rear direction. In the second attachment frame 18, as illustrated in FIGS. 4 and 12, a lower end may be divided into two portions. The divided portions each may be provided with a positioning section 20b and a fall-preventing protrusion 20c. The positioning section 20b is formed by bending forward. The fall-preventing protrusion 20c is formed by bending outward (sideward).

Both the right and the left ends of the mount surface section 9 in the heat dissipation member 5 may be received by the positioning sections 20b, 20b of the second attachment frames 18, 18. Thus, by the second attachment frames 18, 18, vertical positioning of the heat dissipation member 5 with respect to the back chassis 3 may be performed. The positioning of the heat dissipation member 5 by the positioning sections 20b, 20b of the second attachment frames 18, 18 allows vertical positions with respect to the light sources 13, 13, . . . of the light source unit 11 disposed on the mount surface section 9 to be determined.

As described above, the heat dissipation member 5 is positioned by the second attachment frames 18, 18, allowing the vertical positions of the light sources 13, 13, . . . to be determined. Hence, it is possible to position the light sources 13, 13, . . . securely at predetermined positions with a simple structure.

Figure 13:
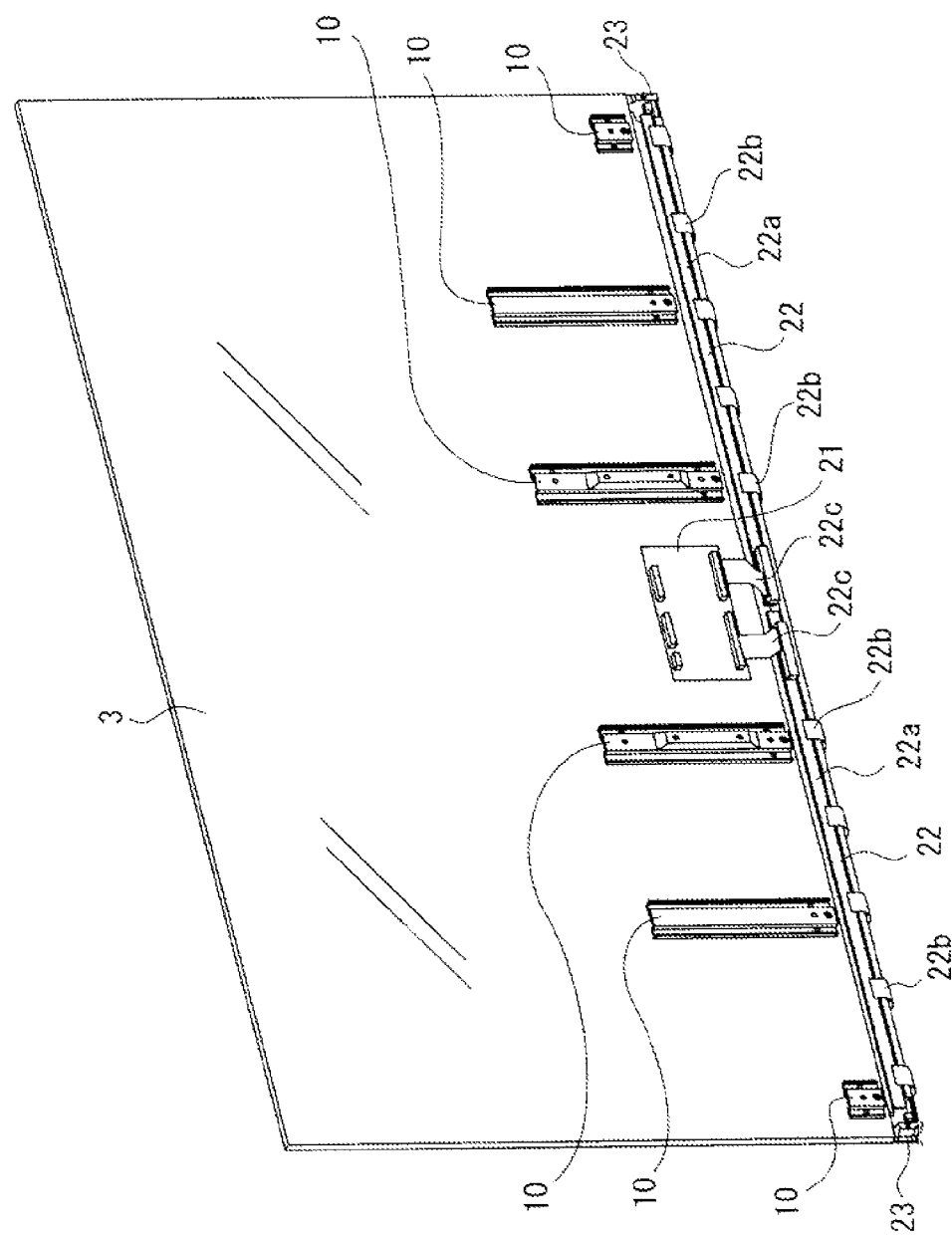
FIG. 13 is a perspective view illustrating a state in which a source board and a relay board are connected to each other on a rear surface side of the back chassis.

To a lower end of the rear surface of the back chassis 3, a relay board 21 may be attached in a center portion in a horizontal direction (refer to FIG. 13).

To a lower end of the display 2, source boards 22, 22 may be connected in a horizontally side-by-side arrangement (refer to FIG. 4). The source board 22 may be configured of, as illustrated in FIGS. 4 and 13, a laterally long drive circuit section 22a, connecting sections 22b, 22b, . . . , and a relay section 22c. The connecting sections 22b, 22b, . . . connect the drive circuit section 22a and the lower end of the display 2, and are provided at horizontally spaced positions. The relay section 22c is connected to one end in a longitudinal direction of the drive circuit section 22a. For each of the connecting sections 22b, 22b, . . . and the relay section 22c, a flexible printed circuit board may be used.

The source board 22 may be in a state in which the connecting sections 22b, 22b, . . . are bent to turn around below the back chassis 3. The drive circuit section 22a may be located at the rear surface of the lower end of the back chassis 3 in a front-rear directed state. In the source board 22, the relay section 22c may be connected to the relay board 21.

Figure 14:
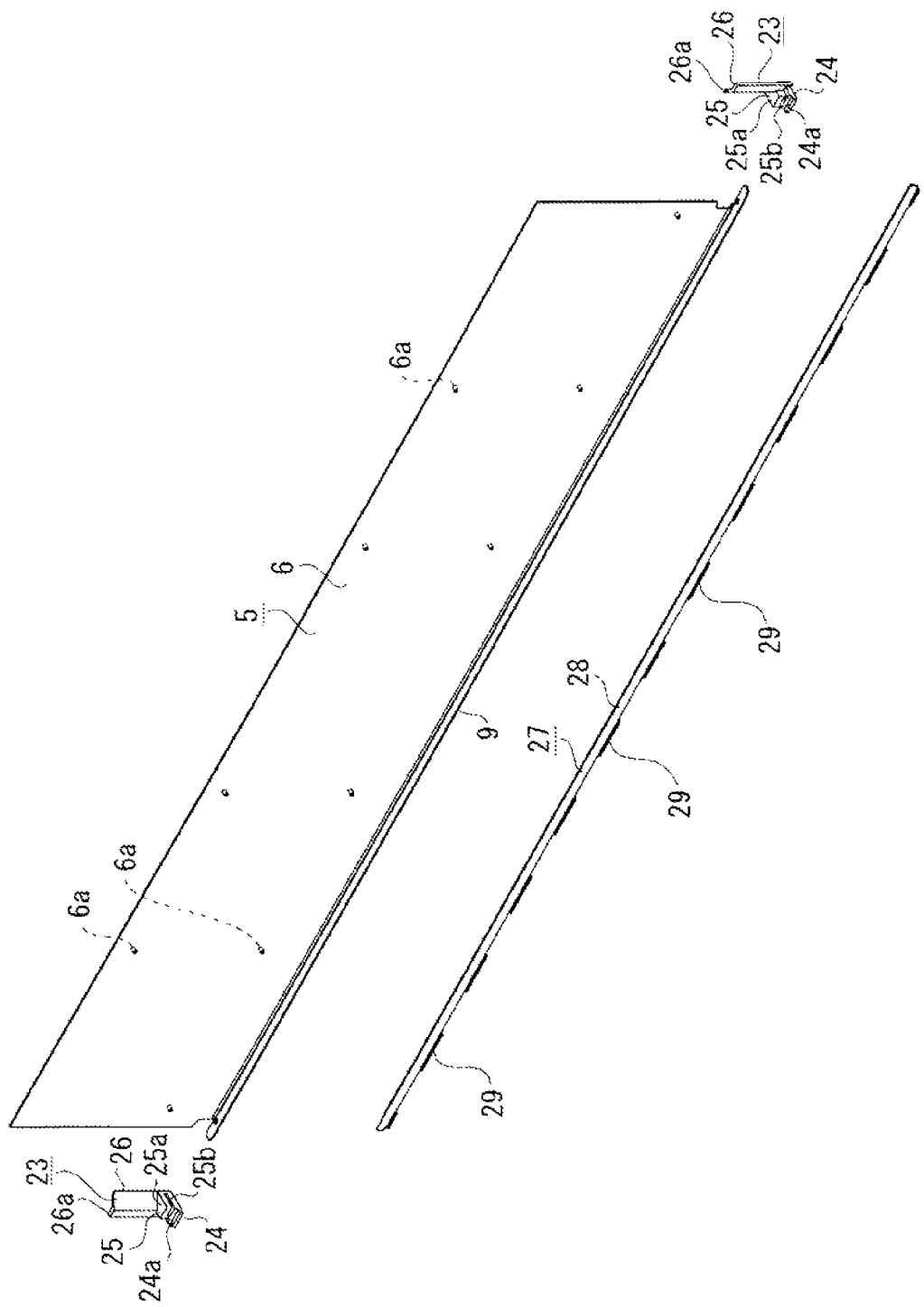
FIG. 14 is an exploded perspective view illustrating the heat dissipation member, the receiving member, and a retaining member.

To both the right and the left ends of the mount surface section 9 in the heat dissipation member 5, receiving members 23, 23 may be attached (refer to FIG. 4). The receiving member 23 may include, as illustrated in FIG. 14, a receiving surface section 24, a receiving protrusion 25, and a ridge portion 26, and the ridge portion 26 may be formed vertically long. The receiving surface section 24 is directed in a substantially vertical direction. The receiving protrusion 25 is protruded upward from a portion on a front end side of the receiving surface section 24. The ridge portion 26 is protruded upward from a portion on a rear end side of the receiving surface section 24.

An upper surface of the receiving surface section 24 may be formed as a first receiving surface 24a.

An upper surface of the receiving protrusion 25 may be formed as a second receiving surface 25a. The receiving protrusion 25 may be provided with an attachment notch 25b that is opened inward (sideward).

An upper surface of the ridge portion 26 may be formed as a third receiving surface 26a.

The receiving members 23, 23 may be attached to the heat dissipation member 5, with both the right and the left ends of the mount surface section 9 interfitted with the attachment notches 25b, 25b. In a state in which the receiving member 23 is attached to the heat dissipation member 5, as illustrated in FIG. 9, the fall-preventing protrusion 20c of the second attachment frame 18 may be located outside the receiving protrusion 25, and the ridge portion 26 may be located on a rear side of the lower end of the second attachment frame 18.

On the first receiving surface 24a of the receiving member 23, the glass plate 2b of the display 2 may be placed. Thus, the display 2 may be received and supported by the receiving member 23. On the second receiving surface 25a of the receiving member 23, a light guide plate, which will be described later, may be placed. Thus, the light guide plate may be received and supported by the receiving member 23. On the third receiving surface 26a of the receiving member 23, the back chassis 3 may be placed. Thus, the back chassis 3 may be received and supported by the receiving member 23.

Figure 15:
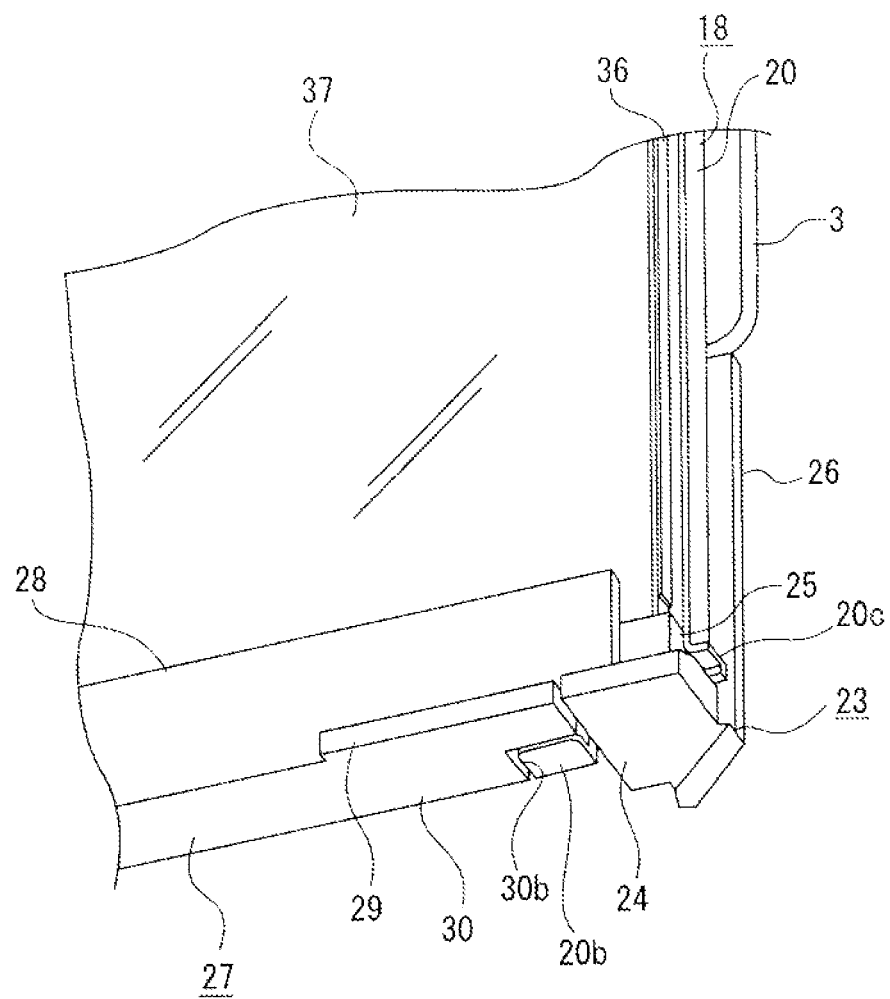
FIG. 15 is a perspective view illustrating a state in which the retaining member is attached to the heat dissipation member.

To the heat dissipation member 5, a retaining member 27 may be attached (refer to FIGS. 14 and 15). The retaining member 27 may be formed in a laterally long shape, and may include a retaining surface section 28, protrusions 29, 29, . . . , and a connecting surface section 30. The retaining surface section 28 is directed in the front-rear direction. The protrusions 29, 29, . . . are protruded forward from a lower end of the retaining surface section 28. The connecting surface section 30 is protruded rearward from a position close to the lower end of the retaining surface section 28.

In a substantially upper half of the retaining surface section 28, a retaining protrusion 28a protruded rearward may be provided.

On both right and left ends of the connecting surface section 30, connecting protrusions 30a, 30a that each are protruded upward may be provided at horizontally spaced positions. Both the right and the left ends of the connecting surface section 30 may be provided with arrangement notches 30b, 30b.

The retaining member 27 may be attached to the heat dissipation member 5, with the connecting protrusions 30a, 30a interfitted with the respective connection holes 9a, 9a of the mount surface section 9. In a state in which the retaining member 27 is attached to the heat dissipation member 5, the positioning sections 20b, 20b of the second attachment frames 18, 18 may be located at the respective arrangement notches 30b, 30b. The retaining protrusion 28a may be located directly on a front side of a lower end of an optical body, which will be described later. Thus, the optical body may be retained by the retaining protrusion 28a from a front side.

To the front surface of the back chassis 3, a reflection plate 31 may be attached (refer to FIG. 3). The reflection plate 31 is located at an inside position of the first attachment frame 15 and the second attachment frames 18, 18.

Figure 16:
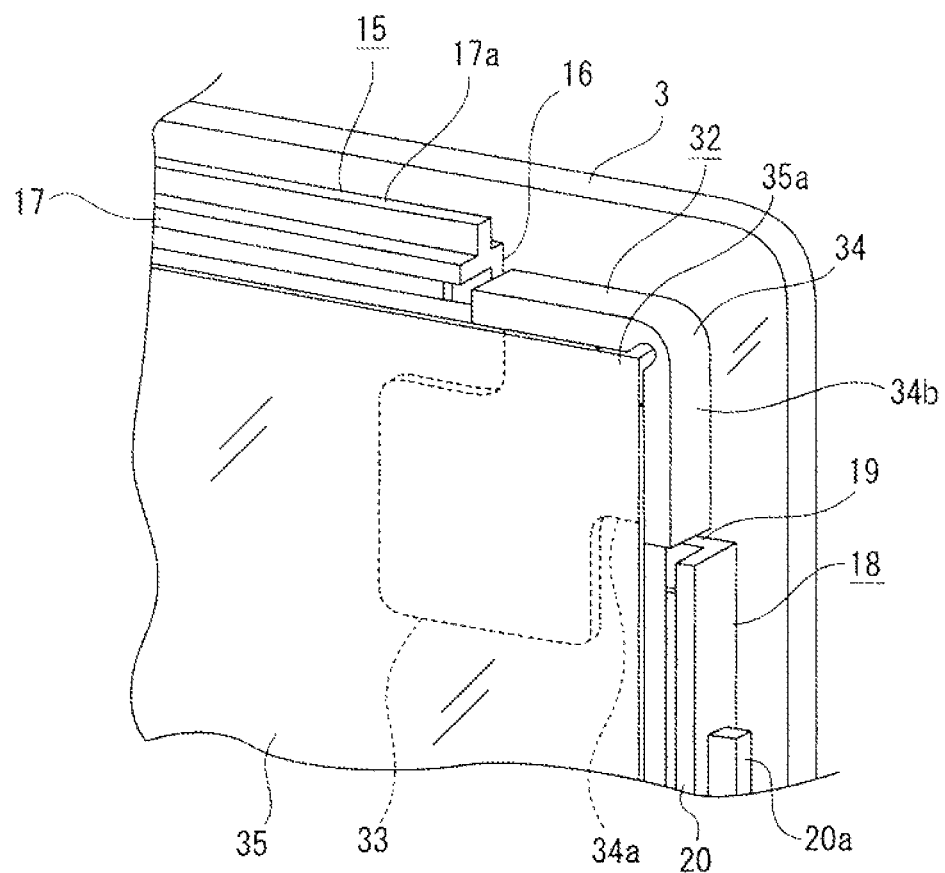
FIG. 16 is a perspective view illustrating a state in which the light guide plate is supported by a support member.
Figure 17:
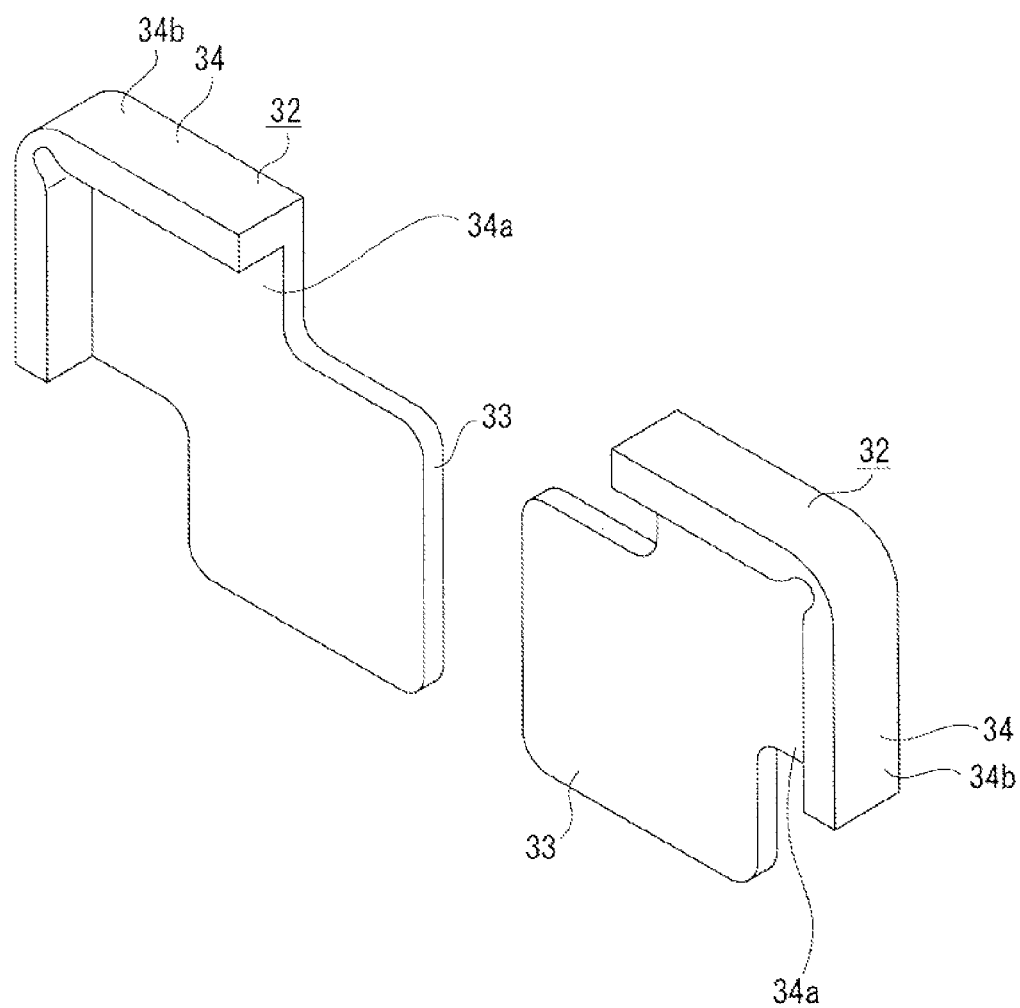
FIG. 17 is an enlarged perspective view of the support member.

To the front surface of the back chassis 3, support members 32, 32 may be attached (refer to FIG. 16). The support members 32 are located at a position near the upper end of the back chassis 3 and near both the right and the left ends of the back chassis 3. As illustrated in FIGS. 16 and 17, the support member 32 may be configured of a base section 33 and a support section 34 that are integrally formed and made of a rubber material or the like. The base section 33 is attached to the back chassis 3 by adhesion or the like. The support section 34 is continuous with the base section 33 and elastically deformable.

The base section 33 may be formed in a plate shape.

The support section 34 may be configured of a supporting surface section 34a and a retaining section 34b. The supporting surface section 34a is formed substantially in same shape and size as those of the base section 33. The retaining section 34b is protruded forward from a part of a periphery of the supporting surface section 34a. The retaining section 34b may be formed in a bent shape into a V shape. In the support section 34, the supporting surface section 34a may be continuous with the base section 33.

Between the back chassis 3 and the display 2, the light guide plate 35 that serves as a light control plate may be disposed (refer to FIGS. 3 and 4). The light guide plate 35 may be formed in a laterally long rectangular shape and made of a resin material such as acrylic or the like. As mentioned above, the light guide plate 35 may be placed on the second receiving surface 25a of the receiving member 23, and supported by the receiving member 23. A rear surface of the light guide plate 35 may be in contact with or close to a front surface of the reflection plate 31.

To an upper surface, and both right and left side surfaces of the light guide plate 35, reflection sheets 36, 36, 36 may be bonded (refer to FIGS. 9, 15, and 16). The reflection sheets 36, 36, 36 are configured to prevent occurrence of leak light from the upper surface, and both the right and the left side surfaces of the light guide plate 35.

The light guide plate 35 may be located directly above the light sources 13, 13, . . . of the light source unit 11, and a lower surface may be located facing the light sources 13, 13, . . . (refer to FIG. 4).

In the light guide plate 35, an upper right corner 35a and an upper left corner 35a may be supported by the respective support sections 34, 34 of the support members 32, 32 (refer to FIG. 16). In other words, the light guide plate 35 may be supported by the support sections 34, 34 in a state in which rear surfaces of the corners 35a, 35a are in contact with front surfaces of the supporting surface sections 34a, 34a while upper surfaces and side surfaces of the corners 35a, 35a are in contact with inner surfaces of the retaining sections 34b, 34b of the support sections 34, 34.

As described above, the light guide plate 35 is supported by the support members 32, 32 including the support sections 34, 34 that are elastically deformable. In this way, when the light guide plate 35 is expanded or contracted due to a change in internal temperature of the display device 1 during use of the display device 1, the support sections 34, 34 are deformed elastically according to the expansion or the contraction. Thus, a supporting state of the light guide plate 35 by the support members 32, 32 is maintained.

Therefore, little load accompanying the expansion or the contraction due to the temperature change is applied to the light guide plate 35. This makes it possible to secure a stable supporting state of the light guide plate 35 with a simple structure while preventing warpage of the light guide plate 35.

Moreover, some of the corners of the light guide plate 35, that is, the corners 35a, 35a on a lower side are received by the receiving members 23, 23 in a surface direction of the light guide plate 35, while others of the corners of the light guide plate 35, that is, the corners 35a, 35a on an upper side are supported by the support sections 34, 34. Thus, the expansion or the contraction of the light guide plate 35 occurs with the second receiving surfaces 25a, 25a of the receiving members 23, 23 as reference positions. This prevents the light guide plate 35 from being displaced downward, and the light guide plate 35 is displaced in a smaller number of directions when a temperature change occurs.

Hence, it is possible to reduce positional changes of the light guide plate 35 with respect to other components. In particular, as described above, the corners 35a, 35a on the lower side of the light guide plate 35 are received by the receiving member 23, 23. This prevents a change in a distance between an incident surface 35b as the lower surface of the light guide plate 35 and the light sources 13, 13, . . . . It is therefore possible to secure a proper state of incidence of light emitted from the light sources 13, 13, . . . on the light guide plate 35 regardless of a temperature change.

It is to be noted that, in the forgoing, an example has been described in which the light guide plate 35 used as the light control plate is supported by the support members 32, 32. However, the support members 32, 32 may be applied to a display device that includes light sources on a front side of the back chassis and uses a diffusion plate as the light control plate. In this case, the diffusion plate may be supported by the support members 32, 32.

Between the display 2 and the back chassis 3, the optical body 37 may be disposed in a state of being in contact with a front surface of the light guide plate 35 (refer to FIGS. 3 and 4). The optical body 37 may have a configuration in which various kinds of optical sheets are stacked in the front-rear direction. The optical body 37 may be configured of lamination of, for example, a polarizing sheet, a prism sheet, a diffusion sheet, a reflection sheet, and so forth.

Figure 18:
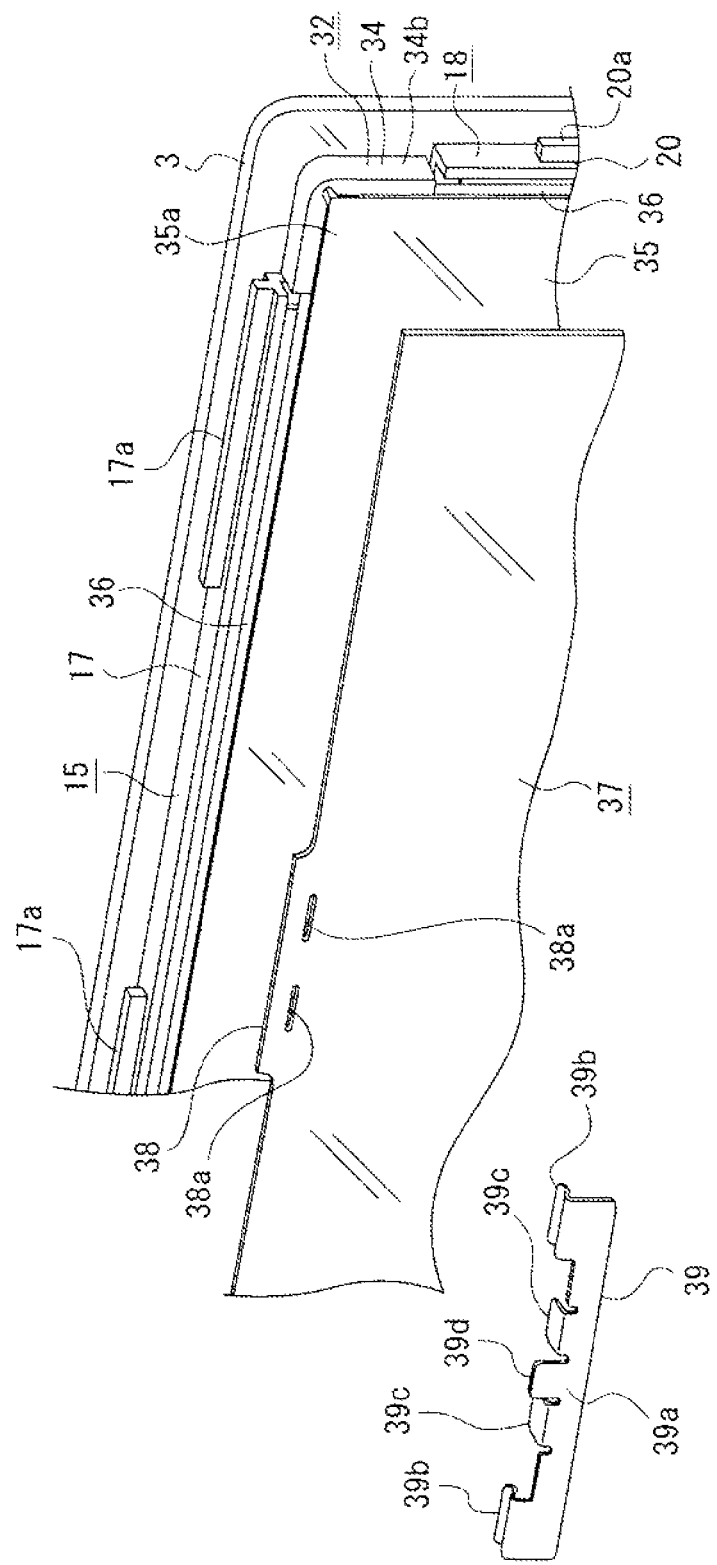
FIG. 18 is an exploded perspective view illustrating a state before an optical body is attached to the attachment frame.

In an upper end of the optical body 37, attached pieces 38, 38, . . . that are protruded upward may be provided at horizontally spaced positions (refer to FIG. 18). In the attached piece 38, laterally long insertion holes 38a, 38a may be provided at horizontally spaced positions.

Figure 19:
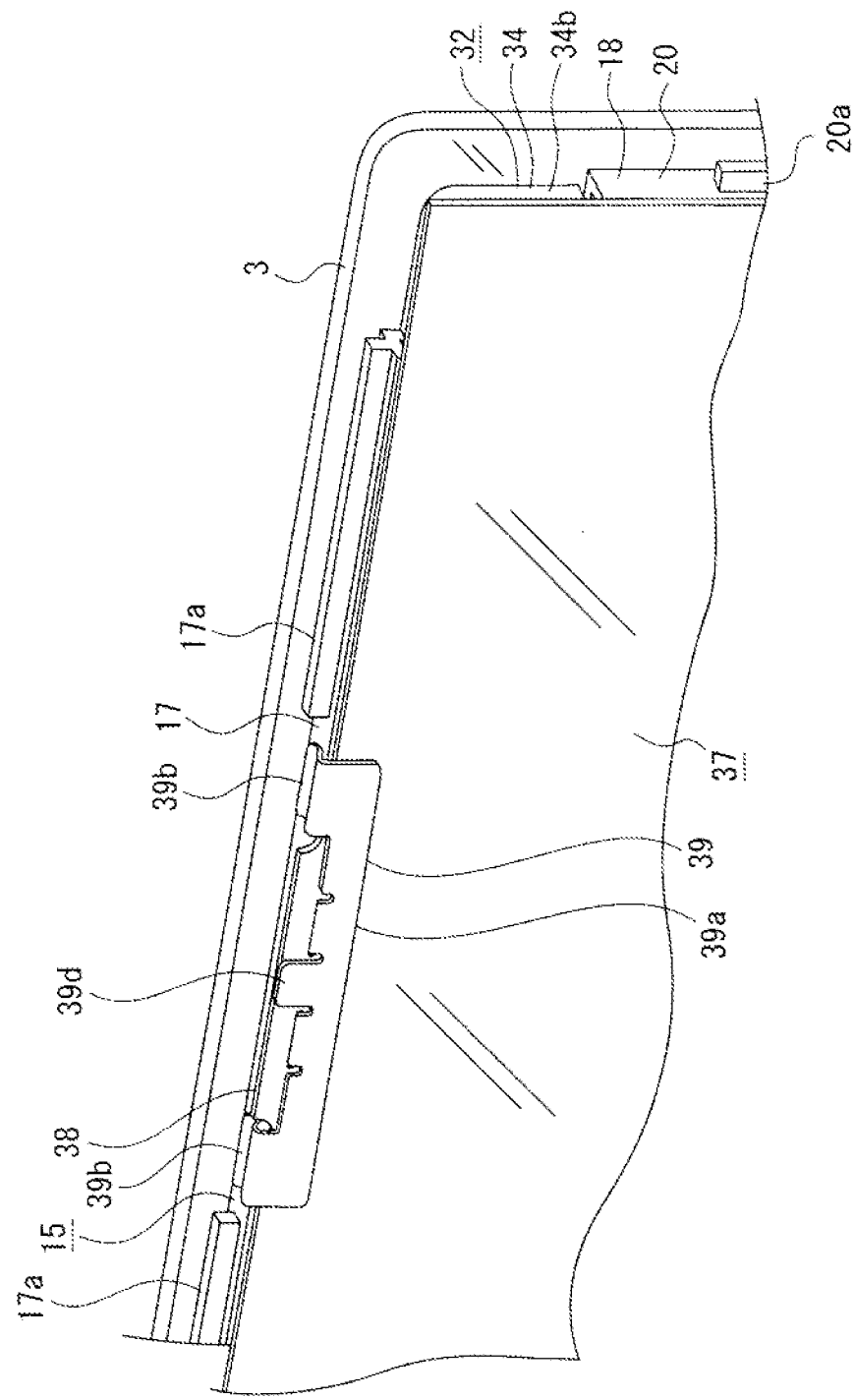
FIG. 19 is a perspective view illustrating a state in which the optical body is attached to the attachment frame.
Figure 20:
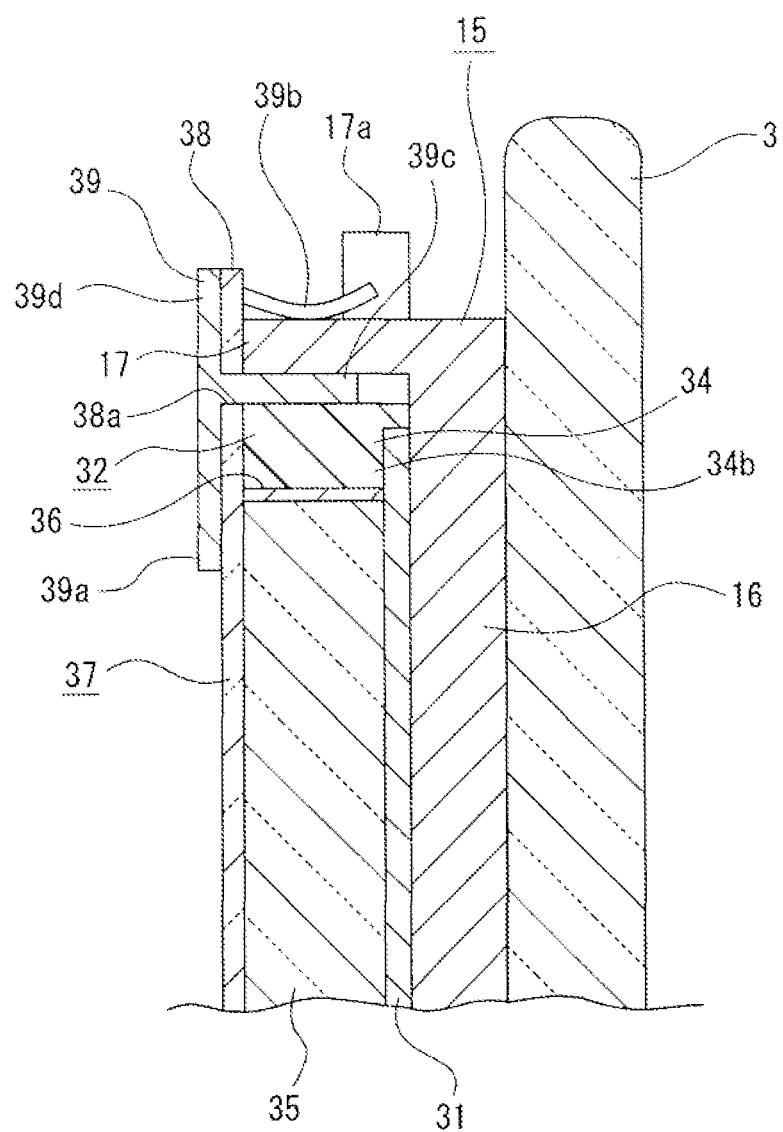
FIG. 20 is an enlarged cross-sectional view illustrating a state in which the optical body is attached to the attachment frame.

The optical body 37 may be retained by sheet holding members 39, 39, . . . and disposed in a state of being in contact with the front surface of the light guide plate 35 (refer to FIGS. 19 and 20).

The sheet holding member 39 may be configured of a retaining surface section 39a, first engaging protrusions 39b, 39b, second engaging protrusions 39c, 39c, and a retaining piece section 39d that are integrally formed. The retaining surface section 39a is laterally long and directed in the front-rear direction. The first engaging protrusions 39b, 39b are protruded rearward from both right and left ends of an upper end of the retaining surface section 39a, respectively. The second engaging protrusions 39c, 39c are protruded rearward from between the first engaging protrusions 39b, 39b in the upper end of the retaining surface section 39a. The retaining piece section 39d is protruded upward from the upper end of the retaining surface section 39a and located between the second engaging protrusions 39c, 39c. The first engaging protrusions 39b, 39b may be deformable elastically in the vertical direction.

The sheet holding member 39 may be connected to the first attachment frame 15 as follows; the second engaging protrusions 39c, 39c are inserted in the respective insertion holes 38a, 38a of the attached piece 38; and the first engaging protrusions 39b, 39b and the second engaging protrusions 39c, 39c are engaged with the protruded surface section 17 of the first attachment frame 15 to hold the protruded surface section 17 from above and below. At this occasion, the first engaging protrusions 39b, 39b are deformed elastically in the vertical direction to secure a stable attaching state of the sheet holding member 39 to the first attachment frame 15.

In a state in which the sheet holding member 39 is attached to the first attachment frame 15, the upper end of the optical body 37 and the attached pieces 38 are pressed from front onto a front surface of the protruded surface section 17 by the retaining surface section 39a and the retaining piece section 39d, respectively. Thus, the optical body 37 is held by the sheet holding member 39 to be disposed in a state of being in contact with the front surface of the light guide plate 35.

As described above, in a state in which the second engaging protrusions 39c, 39c are inserted in the respective insertion holes 38a, 38a, the first engaging protrusions 39b, 39b and the second engaging protrusions 39c, 39c are engaged with the first attachment frame 15. This allows the sheet holding member 39 to be connected to the first attachment frame 15 to allow the optical body 37 to be held.

Accordingly, the sheet holding member 39 is connected to the first attachment frame 15 to allow the optical body 37 to be supported at a predetermined position. Hence, it is possible to support the optical body 37 securely at a predetermined position by simple work.

Moreover, the sheet holding member 39 is provided with the retaining surface section 39a configured to retain the optical body 37 to press the optical body 37 onto the first attachment frame 15. Hence, when the sheet holding member 39 is connected to the first attachment frame 15, the optical body 37 is pressed securely onto the first attachment frame 15. This makes it possible to achieve stabilization of a supporting state of the optical body 37.

It is to be noted that, in the foregoing, an example has been described in which the second engaging protrusions 39c, 39c are inserted in the two respective insertion holes 38a, 38a formed in the attached piece 38 of the optical body 37. However, for example, the attached piece 38 may be provided with one horizontally long insertion hole that is configured to allow the two second engaging protrusions 39c, 39c to be inserted therein.

Figure 21:
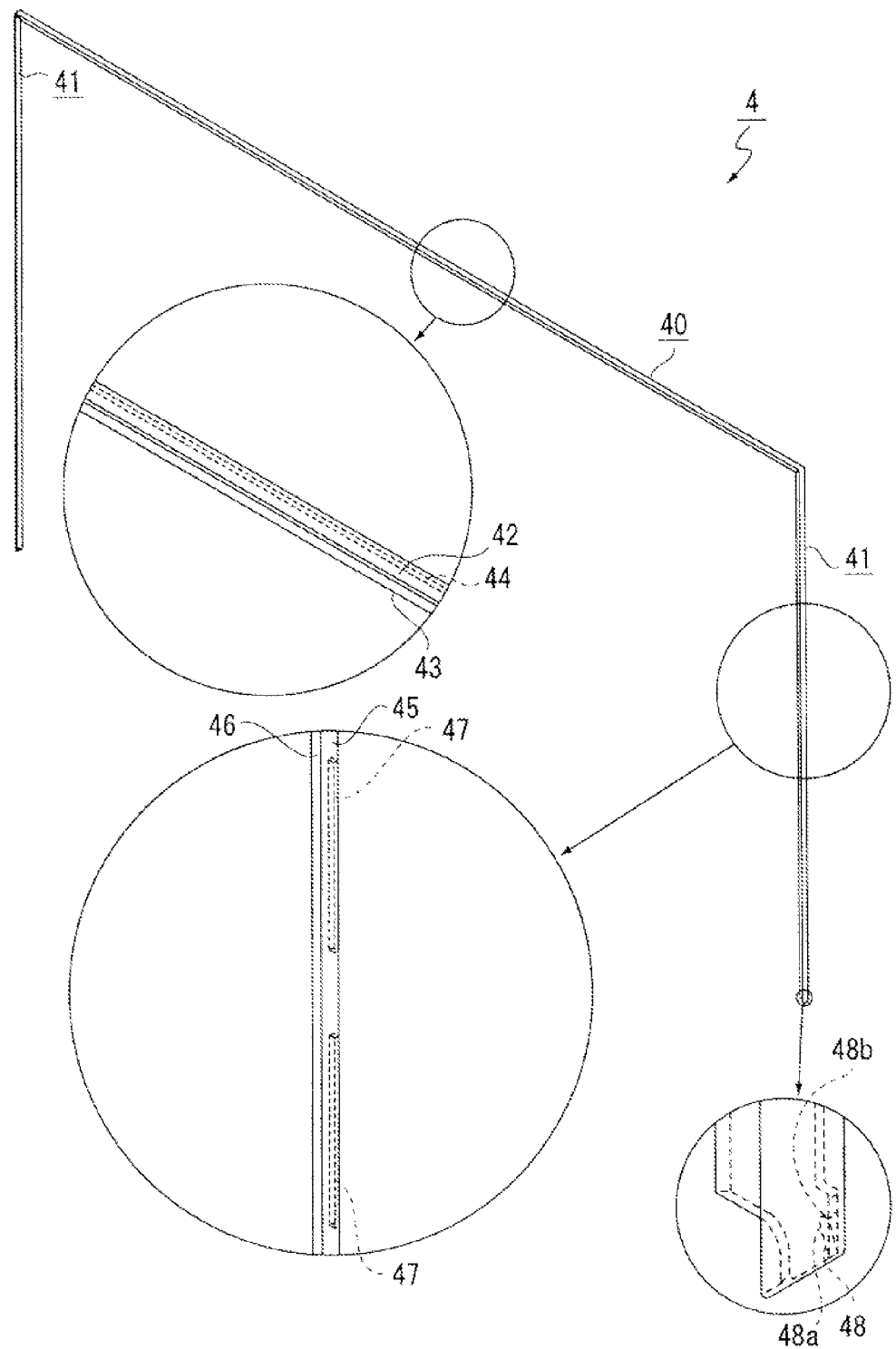
FIG. 21 is a perspective view of the bezel.

The bezel 4 may be configured of a horizontal section 40 and vertical sections 41, 41 that are integrally formed (refer to FIGS. 3 and 21). The horizontal section 40 is extended horizontally. The vertical sections 41, 41 are protruded downward from both right and left ends of the horizontal section 40.

The horizontal section 40 may include a base surface section 42, a seat surface section 43, and an attached protrusion 44. The base surface section 42 is directed vertically. The seat surface section 43 is protruded downward from an intermediate portion in the front-rear direction of the base surface section 42. The attached protrusion 44 is protruded downward from a rear end of the base surface section 42.

The vertical section 41 may include a base surface section 45, a seat surface section 46, and attached protrusions 47, 47, . . . . The base surface section 45 is directed horizontally. The seat surface section 46 is protruded inward (sideward) from an intermediate portion in the front-rear direction of the base surface section 45. The attached protrusions 47, 47, . . . are protruded inward from a rear end of the base surface section 45. The attached protrusions 47, 47, . . . may be provided at vertically spaced positions.

In a lower end of the vertical section 41, a latch protrusion 48 that is protruded inward (sideward) may be provided. The latch protrusion 48 may include a sliding surface 48a and a latching surface 48b. The sliding surface 48a is inclined to be displaced inward as extends upward. The latching surface 48b is continuous with an upper end of the sliding surface 48a and is directed upward.

To front surfaces of the seat surface sections 43, 46, 46 of the bezel 4, respective cushions 49, 49, 49 may be bonded by adhesion or the like (refer to FIG. 3). For the cushion 49, for example, a microcell polymer sheet may be used.

To front surfaces of the cushions 49, 49, 49, an upper end, and both right and left ends of the display 2 may be joined by adhesion. Thus, the display 2 may be attached to the bezel 4 with the cushions 49, 49, 49 in between.

As described above, the display 2 may be attached to the bezel 4 with the cushions 49, 49, 49 in between, to constitute a front side unit 50 that includes the display 2 and the bezel 4.

The front side unit 50 is connected to a rear side unit 51. The rear side unit 51 includes the above-described back chassis 3, and the first attachment frame 15 and the second attachment frames 18, 18 that are attached to the back chassis 3.

The front side unit 50 may be connected to the rear side unit 51 as follows (refer to FIGS. 22 to 25).

Figure 22:
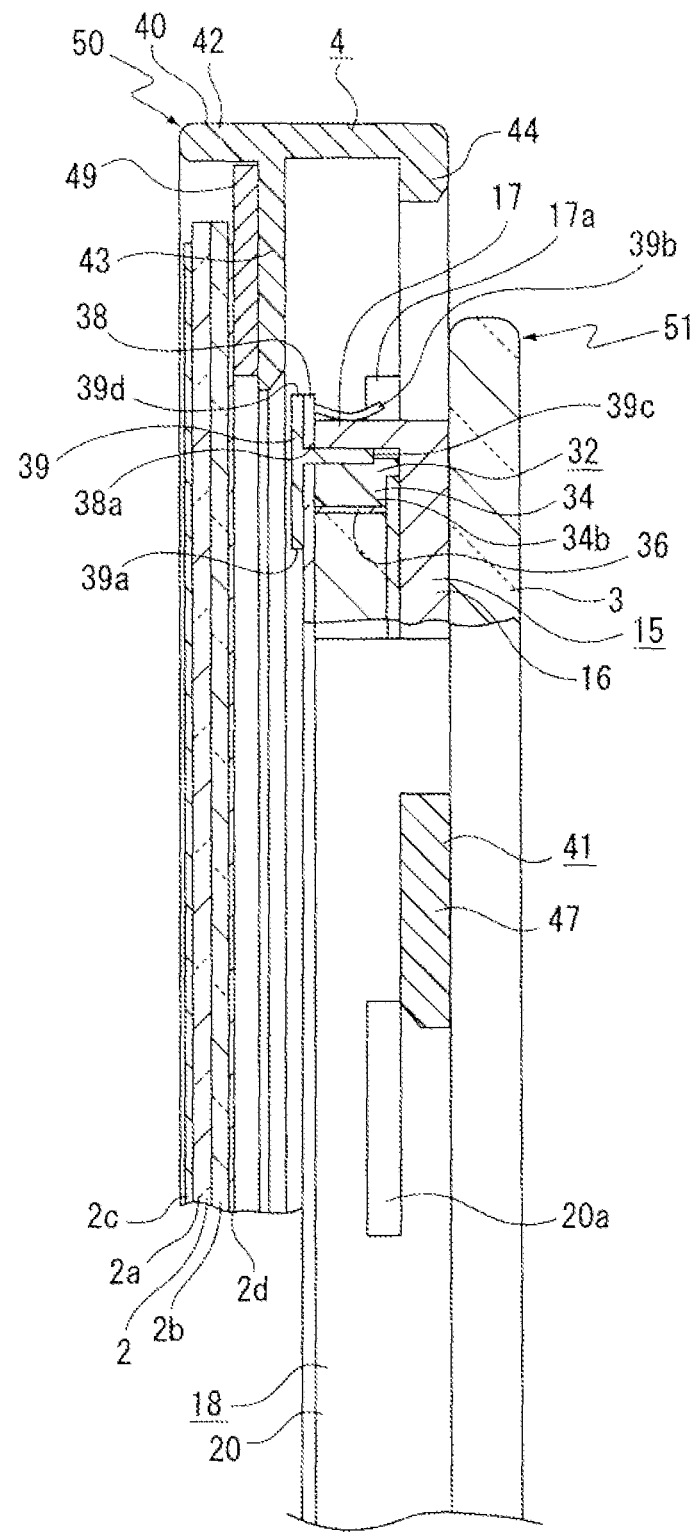
FIG. 22 illustrates, together with FIGS. 23 to 25, procedure of connecting work of a front side unit to a rear side unit, and is an enlarged side view, partially in cross-section, illustrating a state in which the bezel is butted against the back chassis.

First, in a state in which, as described above, the light guide plate 35 and the optical body 37 are disposed on the front side of the back chassis 3, the front side unit 50 may be disposed from front with respect to the rear side unit 51 (refer to FIG. 22). At this occasion, in the bezel 4 of the front side unit 50, the attached protrusion 44 of the horizontal section 40 may be butted against a front surface of the upper end of the back chassis 3, directly on an upper side of the attaching protrusions 17a, 17a, . . . of the first attachment frame 15; and the attached protrusions 47, 47, . . . of the vertical sections 41, 41 may be butted against front surfaces of both the right and the left ends of the back chassis 3, directly on an upper side of the attaching protrusions 20a, 20a, . . . of the second attachment frames 18, 18.

Figure 23:
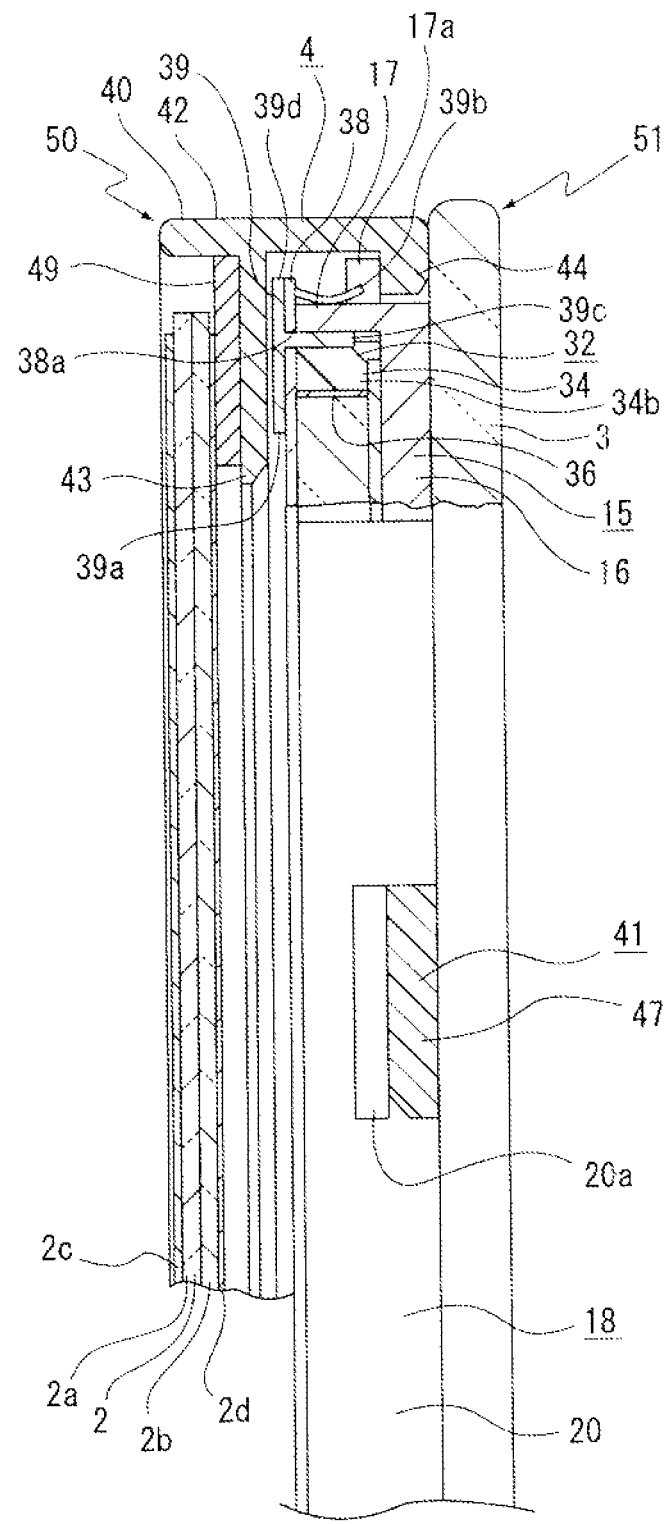
FIG. 23 is an enlarged side view, partially in cross-section, illustrating a state in which the front side unit is slid with respect to the rear side unit to allow both to be connected.

Next, the front side unit 50 may be slid downward with respect to the rear side unit 51 (refer to FIG. 23). When the front side unit 50 is slid downward with respect to the rear side unit 51, the attached protrusion 44 of the horizontal section 40 may be inserted between the attaching protrusions 17a, 17a, . . . of the first attachment frame 15 and the front surface of the back chassis 3 to be interfitted therewith. Thus, the attached protrusion 44 may be engaged with the attaching protrusions 17a, 17a, . . . . Simultaneously, the attached protrusions 47, 47, . . . of the vertical sections 41, 41 may be inserted between the attaching protrusions 20a, 20a, . . . of the second attachment frames 18, 18 and the front surface of the back chassis 3 to be interfitted therewith. Thus, the attached protrusions 47, 47, . . . may be engaged with the respective attaching protrusions 20a, 20a, . . . .

In this way, the front side unit 50 is slid downward with respect to the rear side unit 51, the attached protrusions 44 are engaged with the attaching protrusions 17a, 17a, . . . , and the attached protrusions 47, 47, . . . are engaged with the respective attaching protrusions 20a, 20a, . . . . This allows the front side unit 50 to be connected to the rear side unit 51.

Figure 24:
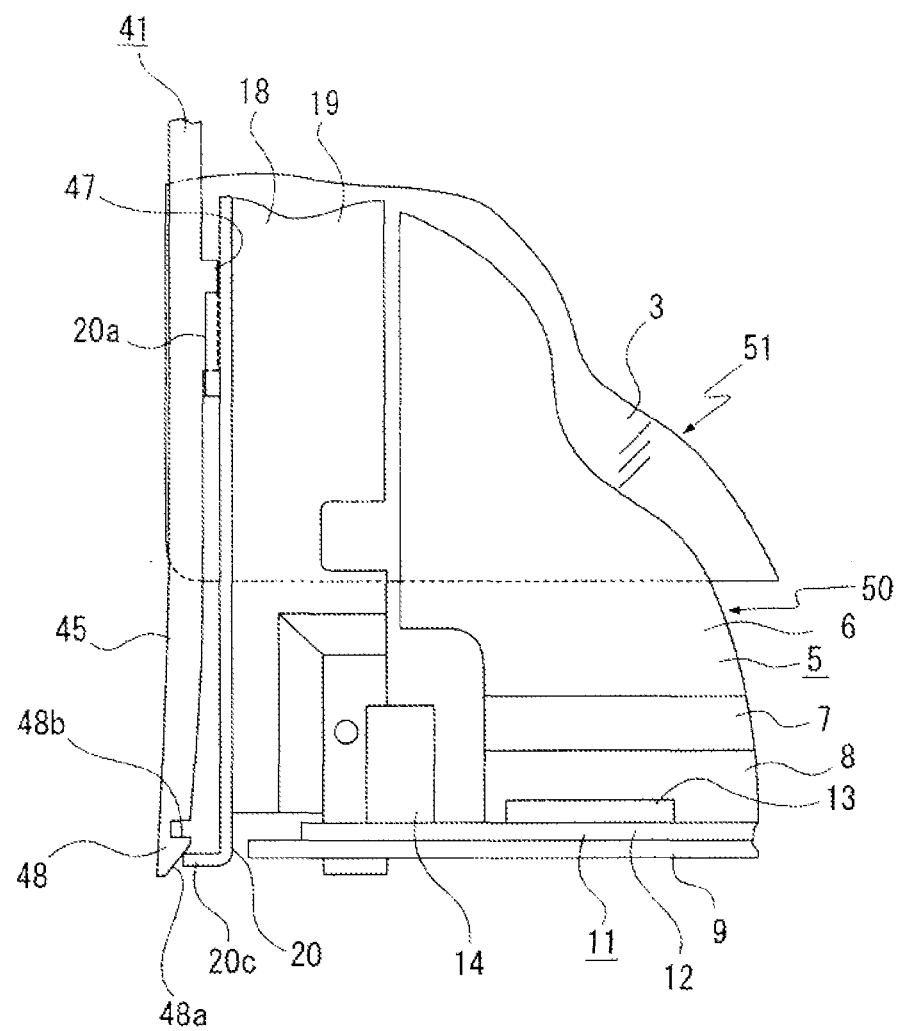
FIG. 24 is an enlarged cross-sectional view illustrating a state in which the latch protrusion of the bezel is slid against the fall-preventing protrusion of the attachment frame to allow the bezel to deform elastically.
Figure 25:
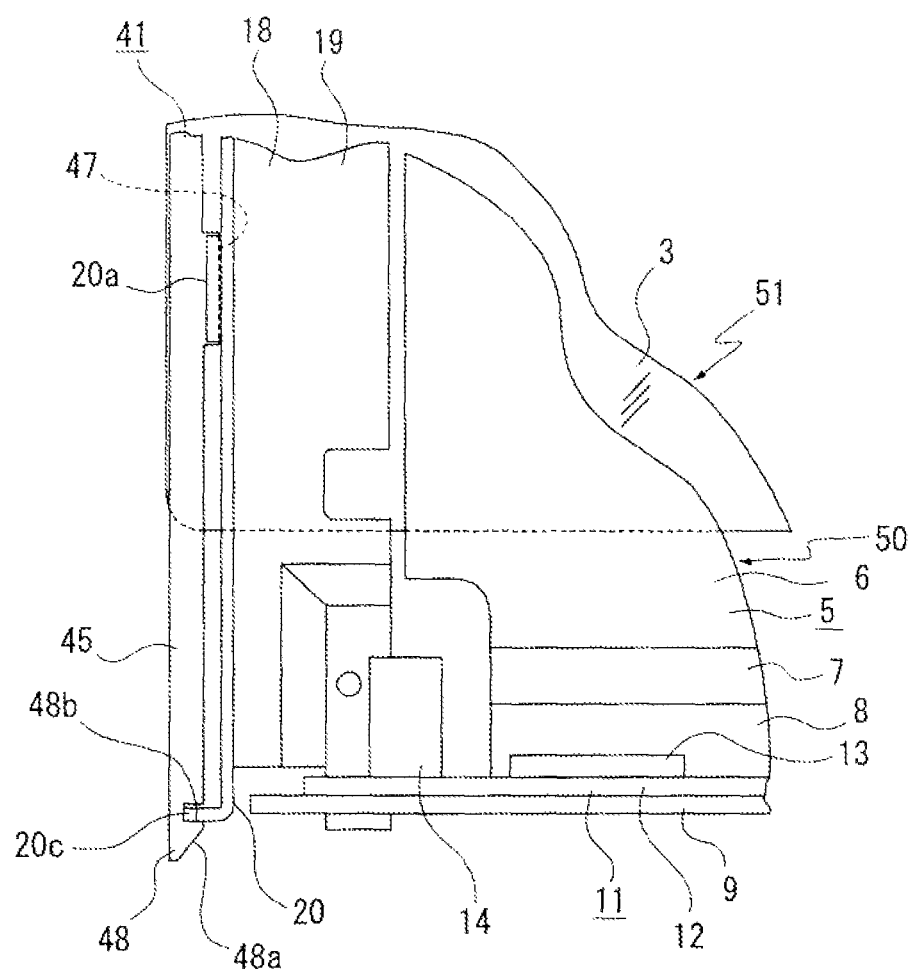
FIG. 25 is an enlarged cross-sectional view illustrating a state in which the latch protrusion of the bezel is latched with the fall-preventing protrusion of the attached frame.
Figure 26:
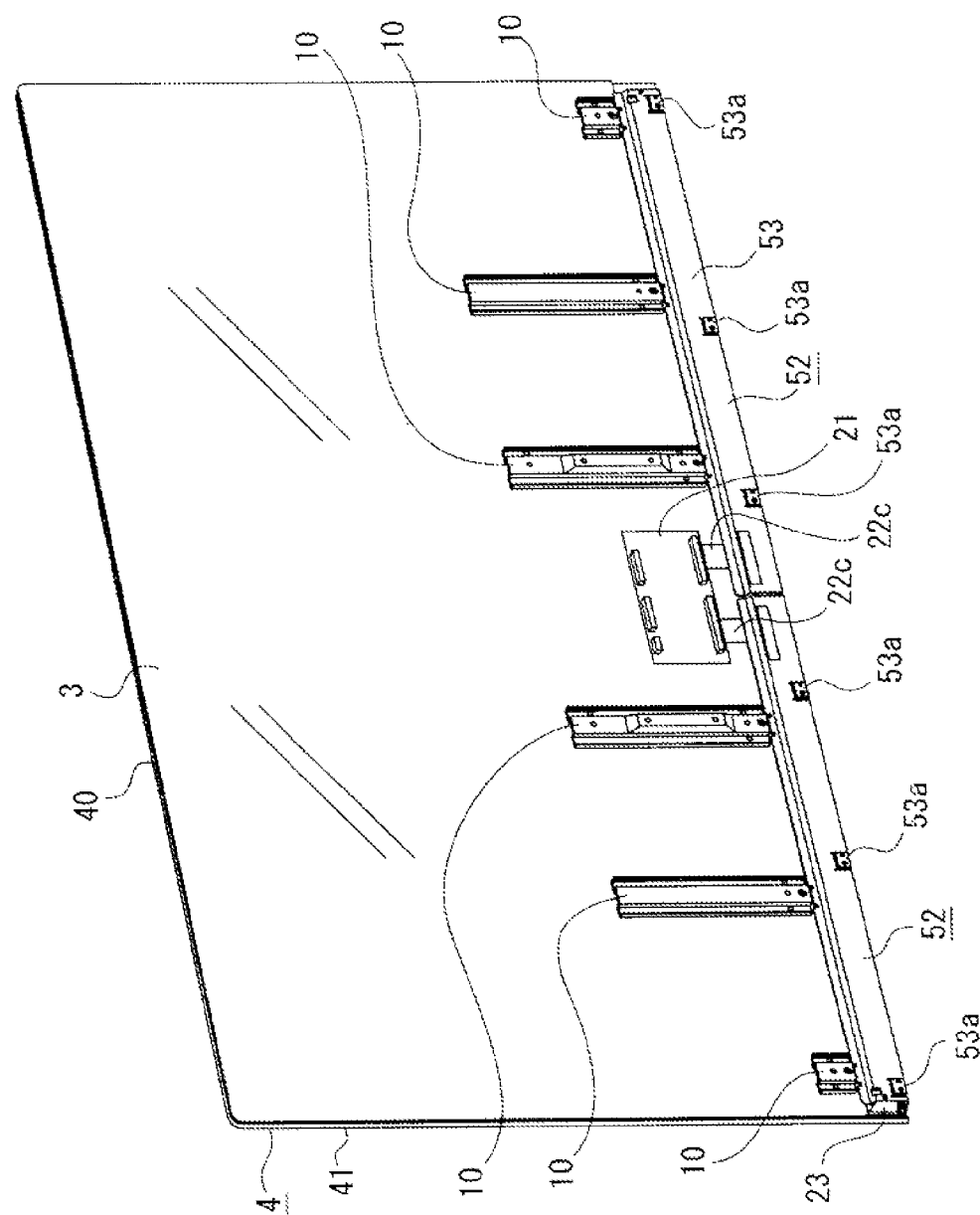
FIG. 26 is a perspective view illustrating a state in which a shield plate is attached to the link member.
Figure 27:
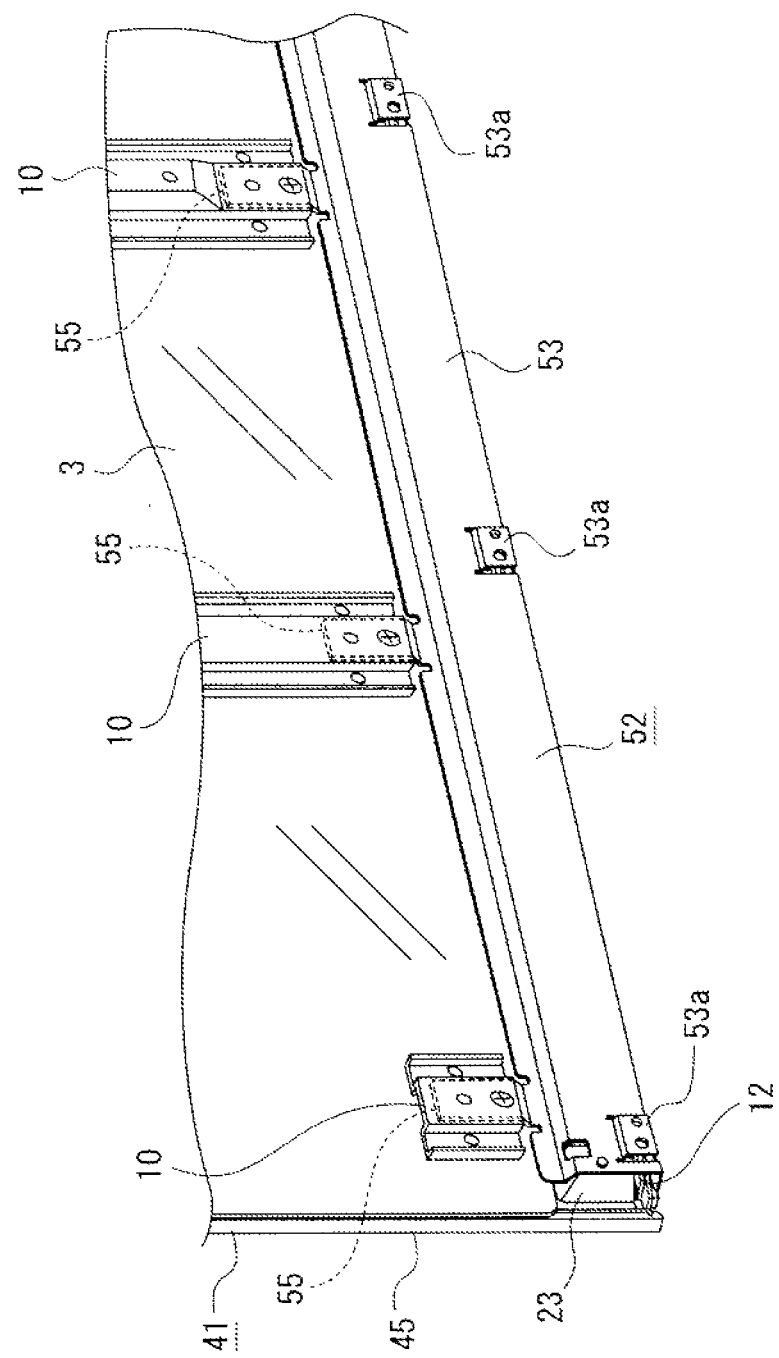
FIG. 27 is an enlarged perspective view illustrating a state in which the shield plate is attached to the link member.

At this occasion, simultaneously, as illustrated in FIG. 24, the sliding surfaces 48a, 48a of the latch protrusions 48, 48 that are provided in the lower ends of the vertical sections 41, 41 are slid against the respective fall-preventing protrusions 20c, 20c of the second attachment frames 18, 18 to allow the vertical sections 41, 41 to deform elastically. The latch protrusions 48, 48 get over the fall-preventing protrusions 20c, 20c to allow the vertical sections 41, 41 to return elastically. This allows the latching surfaces 48b, 48b of the latch protrusions 48, 48 to be latched with the respective fall-preventing protrusions 20c, 20c (refer to FIG. 25).

In this way, the latching surfaces 48b, 48b of the latch protrusions 48, 48 are latched with the respective fall-preventing protrusions 20c, 20c to prevent the front side unit 50 from falling off from the rear side unit 51.

As described above, the sliding of the front side unit 50 allows the vertical sections 41, 41 to deform elastically and return elastically, which allows the latching surfaces 48b, 48b to be latched with the respective fall-preventing protrusions 20c, 20c to prevent the front side unit 50 from falling off from the rear side unit 51. Hence, it is possible to achieve a stable connecting state of the front side unit 50 to the rear side unit 51 by simple work.

To the link members 10, 10, . . . that are attached to the rear surface of the back chassis 3, shield plates 52, 52 may be attached in a horizontally side-by-side arrangement (refer to FIGS. 2, 4, 26, and 27). The shield plate 52 may include a shielding section 53, a lower receiving section 54, and linking piece sections 55, 55, 55. The shielding section 53 is formed in a horizontally extending shape and includes a shallow recess that is opened forward. The lower receiving section 54 is protruded forward from a lower end of the shielding section 53. The linking piece sections 55, 55, 55 are protruded upward from the shielding section 53.

The shielding section 53 may be provided with link sections 53a, 53a, 53a at horizontally spaced positions.

The linking piece sections 55, 55, 55 may be provided at horizontally spaced positions.

The shield plate 52 may be disposed so that the shielding section 53 covers from behind the drive circuit section 22a of the source board 22 that is located on a rear surface in the lower end of the back chassis 3. The linking piece sections 55, 55, 55 may be inserted from below in the respective insertion recesses 10a, 10a, 10a of the link members 10, 10, 10, and attached to the link members 10, 10, 10 by screwing (refer to FIGS. 26 and 27). The lower receiving sections 54, 54 of the shield plates 52, 52 may be located on a lower side of the respective receiving members 23, 23. Thus, the receiving members 23, 23 may be received by the lower receiving sections 54, 54 (refer to FIG. 4).

Figure 2:
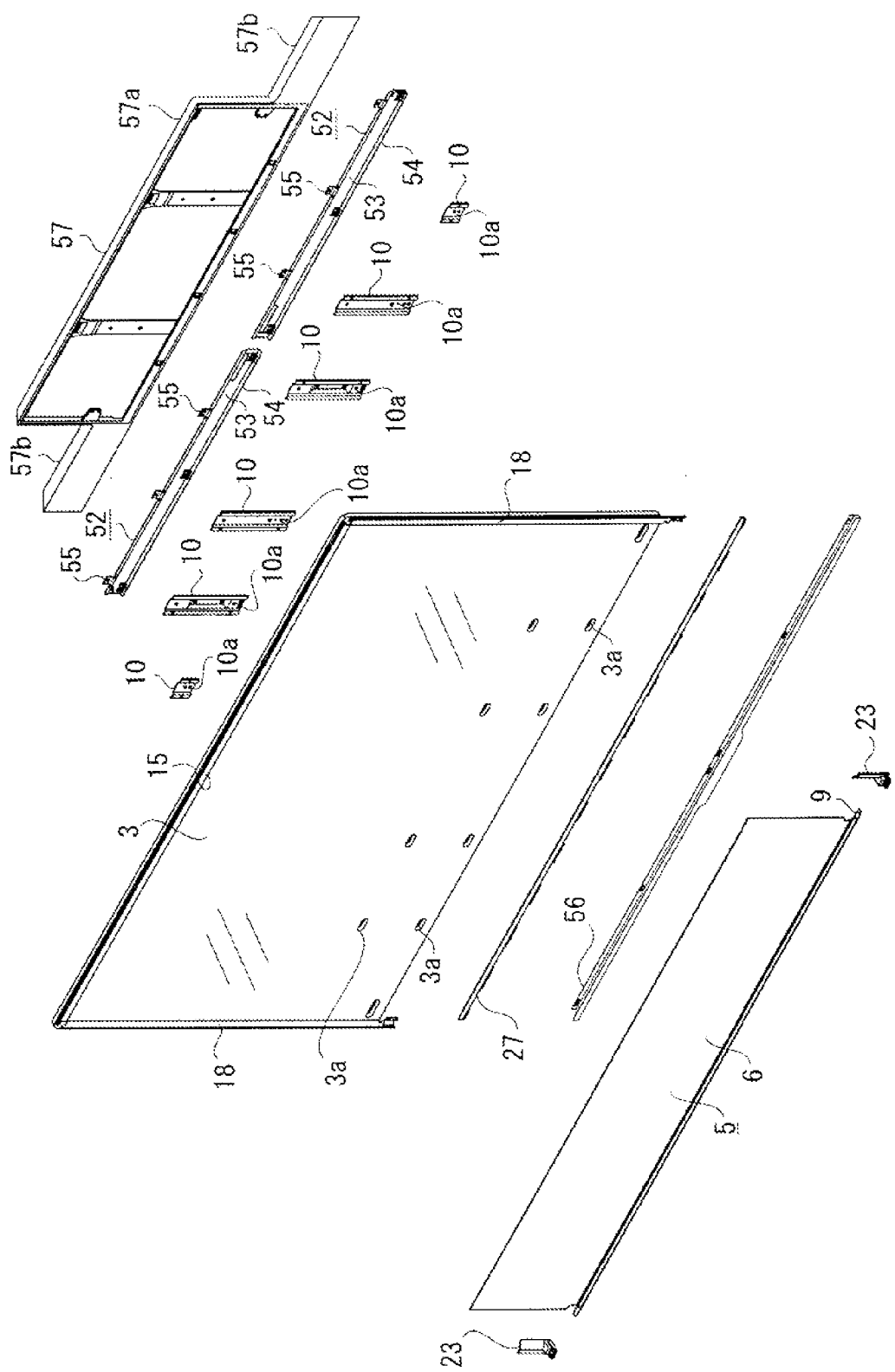
FIG. 2 is an exploded perspective view of part of the display device.
Figure 28:
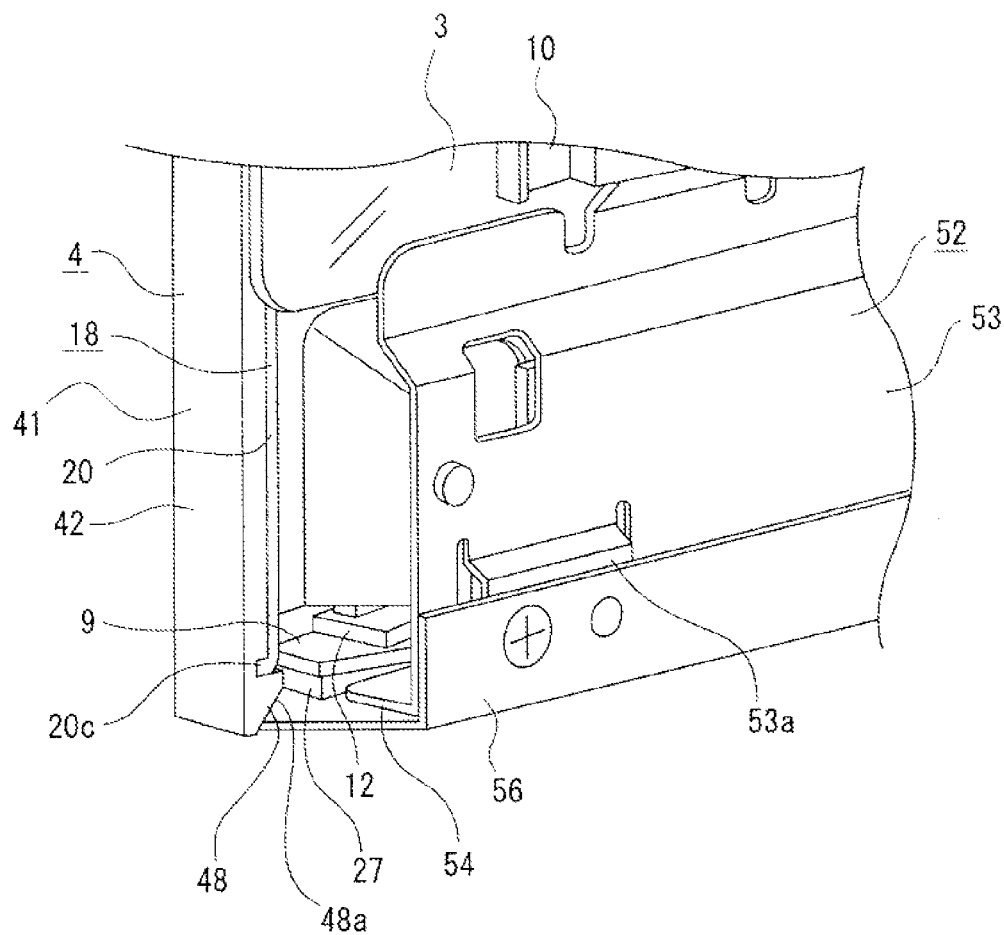
FIG. 28 is an enlarged perspective view illustrating a state in which a bottom frame is attached to the shield plate, with the receiving member omitted.

To the shield plates 52, 52, a bottom frame 56 may be attached (refer to FIGS. 2, 4, and 28). The bottom frame 56 may be formed in a laterally long shape, and may include a front surface section 56a, a lower surface section 56b, and a rear surface section 56c. The front surface section 56a is directed in the front-rear direction. The lower surface section 56b is protruded rearward from a lower end of the front surface section 56a. The rear surface section 56c is protruded upward from a rear end of the lower surface section 56b.

In the bottom frame 56, the rear surface section 56c may be attached to the link sections 53a, 53a, . . . of the shield plates 52, 52 by screwing or the like (refer to FIG. 28). In a state in which the bottom frame 56 is attached to the shield plates 52, 52, as illustrated in FIG. 4, the front surface section 56a may be located on the front side of the lower end of the display 2; and the lower surface section 56b may be located on a lower side of the protrusions 29, 29, . . . of the retaining member 27 and on a lower side of the lower receiving sections 54, 54 of the shield plates 52, 52. In the display 2, its lower end may be retained from front by the front surface section 56a; and the protrusions 29, 29 of the retaining member 27 and the lower receiving sections 54, 54 of the shield plates 52, 52 may be retained from below by the lower surface section 56b; thus, stable attaching states of these members may be secured.

Figure 29:
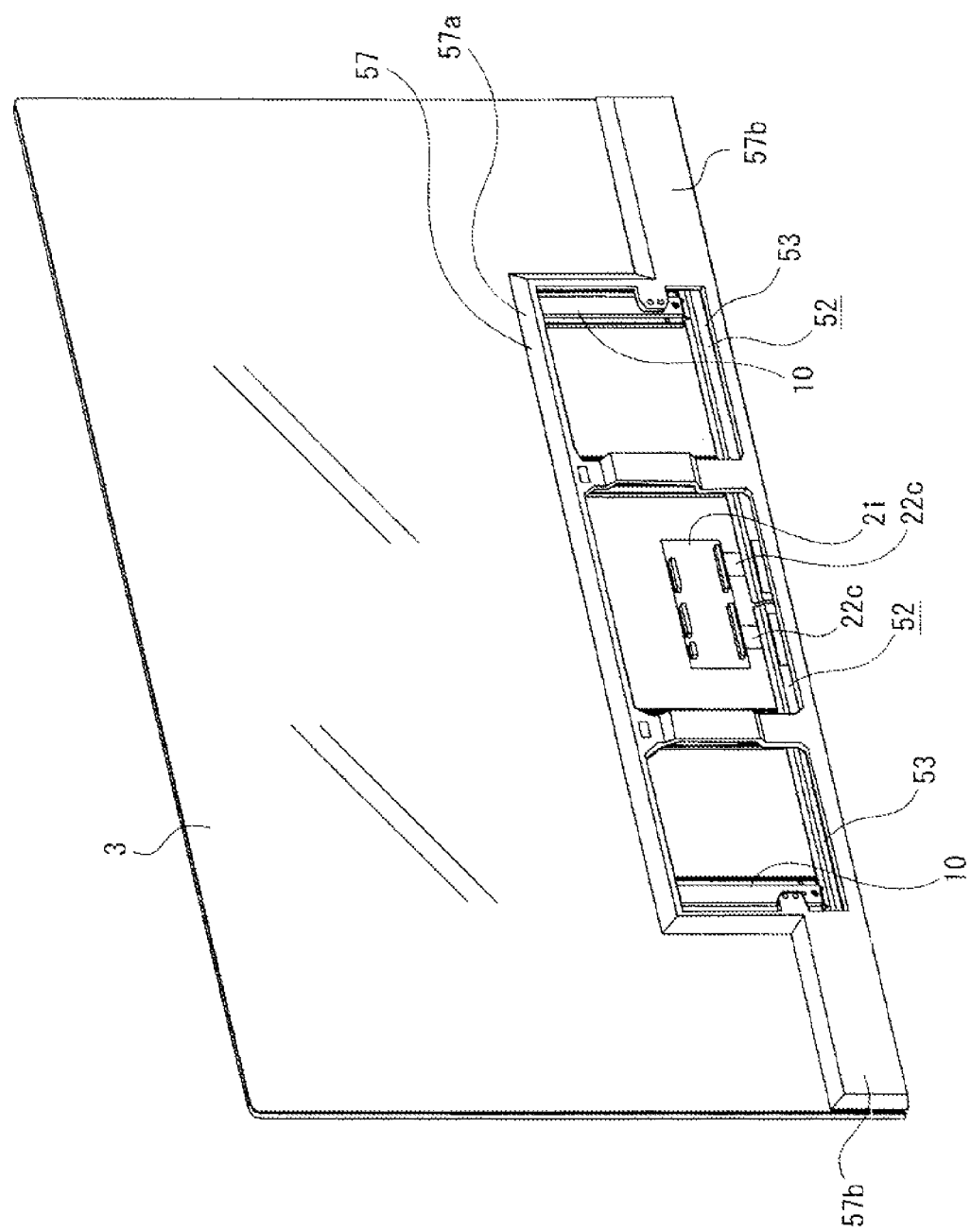
FIG. 29 is a perspective view illustrating a state in which a rear frame is attached to the link member.

On the lower end side in the rear surface of the back chassis 3, a rear frame 57 may be disposed (refer to FIGS. 2 and 29). The rear frame 57 may be attached to the link members 10, 10, . . . by screwing or the like.

The rear frame 57 may be configured of a frame section 57a, and protruded surface sections 57b, 57b. The frame section 57a is formed in a shape of three frames that are horizontally continuous. The protruded surface sections 57b, 57b are protruded rightward and leftward, respectively, from a lower end of the frame section 57a. In a state in which the rear frame 57 is attached to the link members 10, 10, . . . , the relay board 21 that is attached to the rear surface of the back chassis 3 may be located in an exposed state, inside the frame section 57a.

Figure 30:
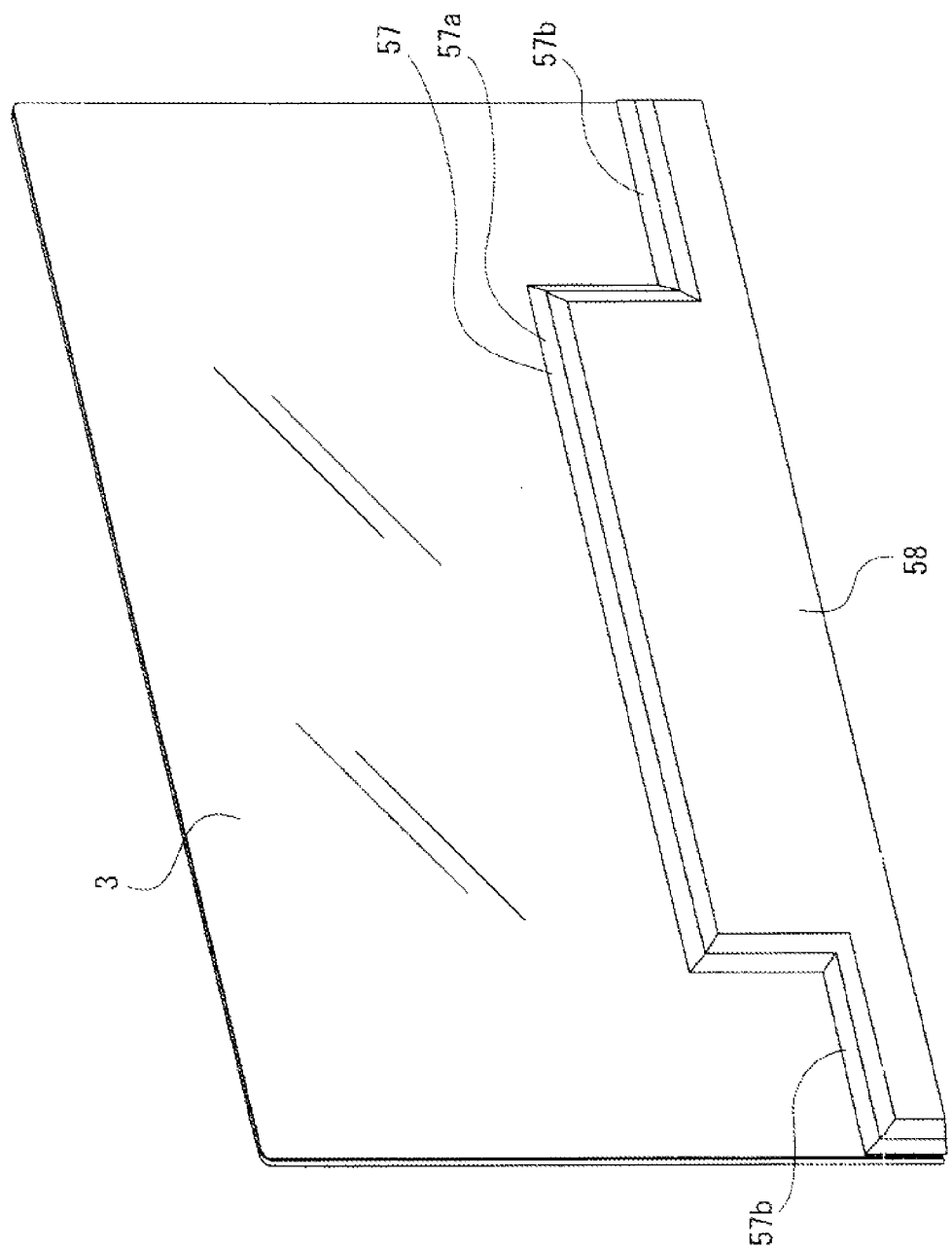
FIG. 30 is a perspective view illustrating a state in which a rear cover is attached to the rear frame.

To the rear frame 57, a rear cover 58 may be attached (refer to FIG. 30). Inside the rear cover 58, an undepicted control circuit board may be disposed.

When the rear cover 58 is attached to the rear frame 57, the control circuit board may be connected to the connector 14 and the relay board 21 through an undepicted connecting substrate. Accordingly, a current or a signal may be supplied to the source board 22 or the light sources 13, 13, . . . from the control circuit board through the connector 14 or the relay board 21, which allows light emission from the light sources 13, 13, . . . or display control of the display 2 to be performed.

Light emitted from the light sources 13, 13, . . . enters the light guide plate 35 through the incident surface 35b, is propagated through inside the light guide plate 35, and is emitted forward. At this occasion, part of the light that enters the light guide plate 35 is reflected by the reflection plate 31 and the reflection sheets 36, 36, . . . to be emitted forward. The light emitted forward from the light guide plate 35 is controlled by the optical body 37 to enter the display 2 as backlight.

Figure 1:
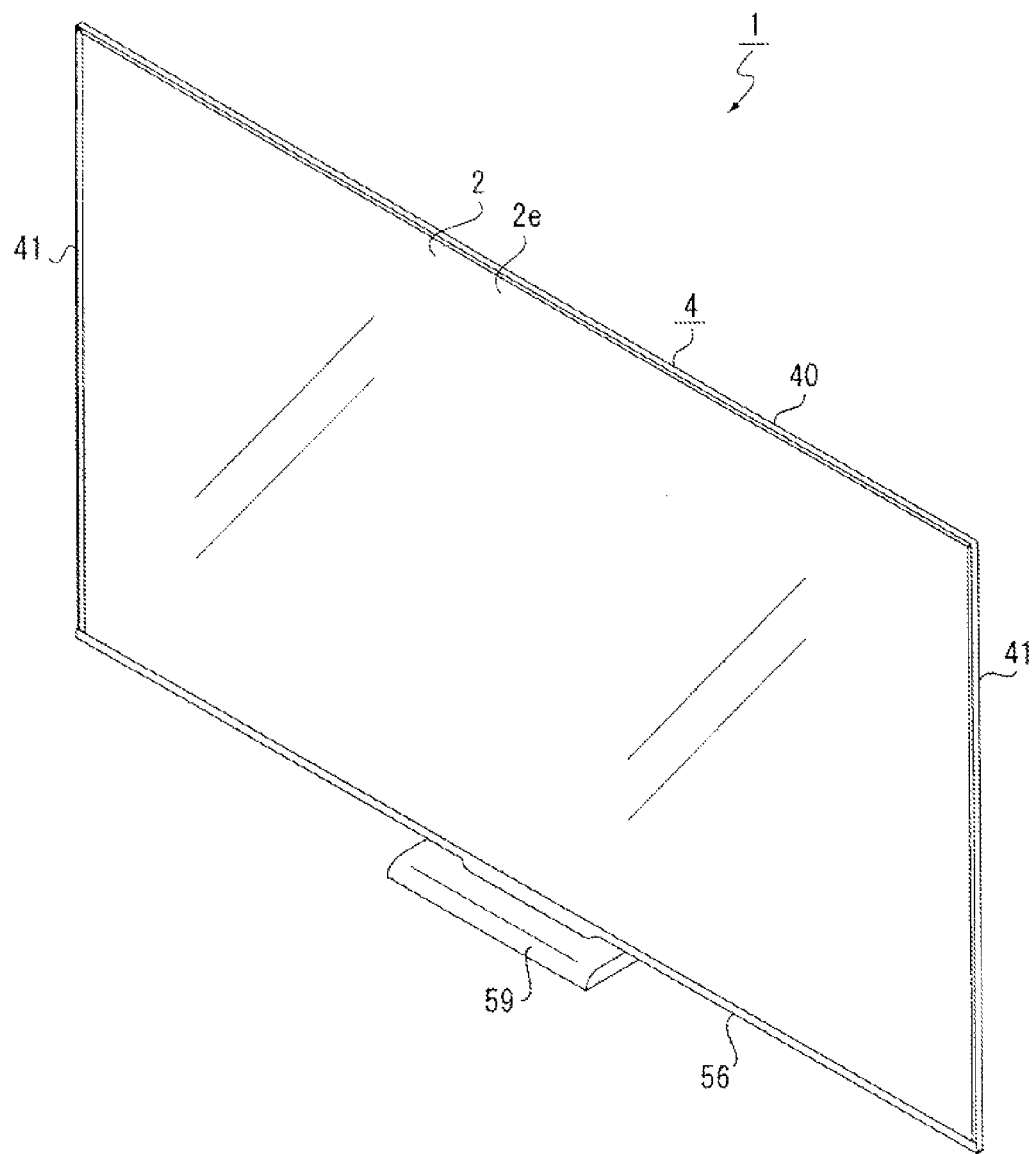
FIG. 1 illustrates, together with FIGS. 2 to 30, a display device according to an embodiment of the present technology, and is a perspective view of the display device.

To the lower end of the back chassis 3, a stand 59 may be attached (refer to FIG. 1). The stand 59 is configured to secure a stable installation state of the display device 1 on a desk or the like.

SUMMARY

As described above, in the display device 1, the front side unit 50 is butted against the rear side unit 51, and the front side unit 50 is slid with respect to the rear side unit 51 vertically, that is, in the surface direction of the display screen 2e. This allows the attached protrusion 44 to be engaged with the attaching protrusions 17a, 17a, . . . , and allows the attached protrusions 47, 47, . . . to be engaged with the attaching protrusions 20a, 20a, . . . . Thus, the front side unit 50 is connected to the rear side unit 51.

Hence, it is possible to facilitate connecting work of the front side unit 50 to the rear side unit 51, and to enhance workability of assembly work of the display device 1.

[Present Technology]

The present technology may have the following configurations.

(1)

A display device, including:

a front side unit that includes a display and a bezel, the display being configured to allow an image to be displayed on a display screen, and the bezel supporting the display from a peripheral side and including an attached protrusion; and a rear side unit that includes a back chassis and an attachment frame, the back chassis being disposed on an opposite surface side to the display screen of the display, and the attachment frame being attached to a surface on a display side of the back chassis and including an attaching protrusion, wherein the front side unit is configured to be butted against the rear side unit and slid with respect to the rear side unit in a surface direction of the display screen, allowing the attached protrusion to be engaged with the attaching protrusion to allow the front side unit to be connected to the rear side unit.

(2)

The display device according to the above-described (1), wherein the bezel is elastically deformable, the bezel includes a latch protrusion, and the attachment frame includes a fall-preventing protrusion, wherein the latch protrusion is configured, when the front side unit is slid with respect to the rear side unit, to be slid against the fall-preventing protrusion to allow the bezel to deform elastically, to get over the fall-preventing protrusion to allow the bezel to return elastically, and to be latched with the fall-preventing protrusion.

(3)

The display device according to the above-described (1) or (2), including:

a light source configured to emit light as backlight that is incident on the display;

a light control plate disposed between the back chassis and the display, the light control plate being configured to control light emitted from the light source; and a support member attached to the back chassis, wherein the support member includes a base section and a support section, the base section being attached to the back chassis, and the support section being continuous with the base section and being elastically deformable, and the support section is configured to support at least part of the light control plate and to deform elastically in response to expansion or contraction of the light control plate due to a temperature change.

(4)

The display device according to the above-described (3), including a receiving member, wherein the light control plate includes corners, some of which are received by the receiving member in a surface direction of the light control plate, and others of which are supported by the support section.

(5)

The display device according to any one of the above-described (1) to (4), including:

a light source unit including a light source configured to emit light as backlight that is incident on the display; and a heat dissipation member attached to the back chassis, the heat dissipation member being configured to release heat generated when the light source is driven, wherein the light source unit is disposed on the heat dissipation member, and the attachment frame includes a positioning section configured to perform positioning of the heat dissipation member.

(6)

The display device according to any one of the above-described (1) to (5), including:

an optical body disposed between the display and the back chassis, the optical body including an optical sheet and an insertion hole; and a sheet holding member including a first engaging protrusion and a second engaging protrusion, the first engaging protrusion being engaged with the attachment frame, and the second engaging protrusion being inserted in the insertion hole, wherein the first engaging protrusion and the second engaging protrusion are configured to be engaged with the attachment frame in a state in which the second engaging protrusion is inserted in the insertion hole, allowing the sheet holding member to be connected to the attachment frame to allow the optical body to be held.

(7)

The display device according to the above-described (6), wherein the sheet holding member includes a retaining surface section, the retaining surface section retaining the optical body to press the optical body onto the attachment frame.

Specific shape and structure of each section that have been exemplified in the example embodiment to carry out the above-described technology are merely an example in carrying out the present technology, and the technical range of the present technology should not be interpreted in a limited manner by these.

This application claims the benefit of Japanese Priority Patent Application JP 2012-274057 filed on Dec. 14, 2012, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display device, comprising:
a front side unit that includes a display and a bezel, the display being configured to allow an image to be displayed on a display screen, and the bezel supporting the display from a peripheral side and including an attached protrusion; and
a rear side unit that includes a back chassis and an attachment frame, the back chassis being disposed on an opposite surface side to the display screen of the display, and the attachment frame being attached to a surface on a display side of the back chassis and including an attaching protrusion,
wherein the front side unit is configured to be butted against the rear side unit and slid with respect to the rear side unit in a surface direction of the display screen, allowing the attached protrusion to be engaged with the attaching protrusion to allow the front side unit to be connected to the rear side unit.

2. The display device according to claim 1, wherein
the bezel is elastically deformable,
the bezel includes a latch protrusion, and
the attachment frame includes a fall-preventing protrusion,
wherein the latch protrusion is configured, when the front side unit is slid with respect to the rear side unit, to be slid against the fall-preventing protrusion to allow the bezel to deform elastically, to get over the fall-preventing protrusion to allow the bezel to return elastically, and to be latched with the fall-preventing protrusion.

3. The display device according to claim 1, comprising:
a light source configured to emit light as backlight that is incident on the display;
a light control plate disposed between the back chassis and the display, the light control plate being configured to control light emitted from the light source; and
a support member attached to the back chassis,
wherein the support member includes a base section and a support section, the base section being attached to the back chassis, and the support section being continuous with the base section and being elastically deformable, and
the support section is configured to support at least part of the light control plate and to deform elastically in response to expansion or contraction of the light control plate due to a temperature change.

4. The display device according to claim 3, comprising a receiving member,
wherein the light control plate includes corners, some of which are received by the receiving member in a surface direction of the light control plate, and others of which are supported by the support section.

5. The display device according to claim 1, comprising:
a light source unit including a light source configured to emit light as backlight that is incident on the display; and
a heat dissipation member attached to the back chassis, the heat dissipation member being configured to release heat generated when the light source is driven,
wherein the light source unit is disposed on the heat dissipation member, and
the attachment frame includes a positioning section configured to perform positioning of the heat dissipation member.

6. The display device according to claim 1, comprising:
an optical body disposed between the display and the back chassis, the optical body including an optical sheet and an insertion hole; and
a sheet holding member including a first engaging protrusion and a second engaging protrusion, the first engaging protrusion being engaged with the attachment frame, and the second engaging protrusion being inserted in the insertion hole,
wherein the first engaging protrusion and the second engaging protrusion are configured to be engaged with the attachment frame in a state in which the second engaging protrusion is inserted in the insertion hole, allowing the sheet holding member to be connected to the attachment frame to allow the optical body to be held.

7. The display device according to claim 6, wherein
the sheet holding member includes a retaining surface section, the retaining surface section retaining the optical body to press the optical body onto the attachment frame.

* * * * *